United States Patent
Dai et al.

(10) Patent No.: US 12,473,273 B2
(45) Date of Patent: *Nov. 18, 2025

(54) QUINOLINE COMPOUNDS AND COMPOSITIONS FOR INHIBITING EZH2

(71) Applicant: Novartis AG, Basel (CH)

(72) Inventors: Xuan Dai, Shanghai (CN); Michael Dore, Quebec (CA); Xiang-Ju Justin Gu, Shanghai (CN); Ling Li, Shanghai (CN); Kun Chin Liu, Shanghai (CN); Sing Yeung Frankie Mak, Cintech IV (SG); Yuan Mi, Shanghai (CN); Counde Oyang, Sunnyvale, CA (US); Julien Papillon, Cambridge, MA (US); Wei (Vicky) Qi, Shanghai (CN); Xiaoxia Yan, Shanghai (CN); Zhengtian Yu, Shanghai (CN); Ji Yue (Jeff) Zhang, Shanghai (CN); Kehao Zhao, Newton, MA (US)

(73) Assignee: NOVARTIS AG, Basel (CH)

( * ) Notice: Subject to any disclaimer, the term of this patent is extended or adjusted under 35 U.S.C. 154(b) by 413 days.

This patent is subject to a terminal disclaimer.

(21) Appl. No.: 17/919,490

(22) PCT Filed: Aug. 10, 2021

(86) PCT No.: PCT/CN2021/111910
§ 371 (c)(1),
(2) Date: Oct. 17, 2022

(87) PCT Pub. No.: WO2022/033492
PCT Pub. Date: Feb. 17, 2022

(65) Prior Publication Data
US 2023/0167100 A1    Jun. 1, 2023

(30) Foreign Application Priority Data
Aug. 10, 2020  (WO) ................ PCT/CN2020/108213

(51) Int. Cl.
C07D 405/14  (2006.01)
A61K 45/06   (2006.01)

(52) U.S. Cl.
CPC ............ *C07D 405/14* (2013.01); *A61K 45/06* (2013.01)

(58) Field of Classification Search
None
See application file for complete search history.

(56) References Cited

U.S. PATENT DOCUMENTS

2022/0280509 A1*  9/2022  Li .................. A61K 31/506

FOREIGN PATENT DOCUMENTS

| | | |
|---|---|---|
| CN | 109912576 A | 6/2019 |
| CN | 110621316 A | 12/2019 |
| JP | 2006501186 A | 1/2006 |
| JP | 2006124387 A | 5/2006 |
| JP | 2017519013 A | 7/2017 |
| JP | 2019524872 A | 9/2019 |
| WO | WO-2012068589 A2 | 5/2012 |
| WO | WO-2021057853 A1 | 4/2021 |
| WO | WO-2022033492 A1 | 2/2022 |

OTHER PUBLICATIONS

Sanchez et al., Journal of Medicinal Chemistry 1988 31 (5), 983-991 (Year: 1988).*
McCabe et al., Nature 492, 108-112 (2012) (Year: 2012).*
Italiano et al., Lancet Oncol. May 2018; 19(5):649-659 (Year: 2018).*
Wu, Y. et al., "Identification of novel EZH2 inhibitors through pharmacophore-based virtual screening and biological assays." Bioorganic & Medicinal Chemistry Letters (Aug. 1, 2016); 26(15): 3813-3817.

* cited by examiner

*Primary Examiner* — Jeffrey S Lundgren
*Assistant Examiner* — Anthony Joseph Seitz
(74) *Attorney, Agent, or Firm* — Seed Intellectual Property Law Group LLP

(57) ABSTRACT

The invention disclosed herein relates to aza-quinoline compounds of Formula (I),

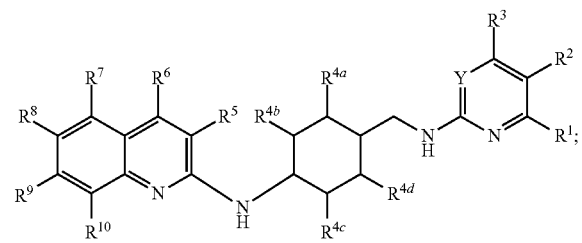

pharmaceutical compositions comprising such compounds; and the use of such compounds for treating a disease or condition mediated by Enhancer of Zeste Homolog 2 (EZH2), Polycomb Repressive Complex 2 (PRC2), or a combination thereof.

19 Claims, No Drawings

QUINOLINE COMPOUNDS AND COMPOSITIONS FOR INHIBITING EZH2

CROSS-REFERENCE TO RELATED APPLICATIONS

This application is a U.S. National Phase Application, filed under 35 U.S.C. 371, of International Application No. PCT/CN2021/111910, filed on Aug. 10, 2021, which claims priority to PCT/CN2020/108213, filed Aug. 10, 2020, the entire contents of each of which are incorporated by reference herein in their entireties.

FIELD OF THE INVENTION

The present invention relates to compounds, compositions and methods for inhibiting Enhancer of Zeste Homolog (EZH2), Polycomb Repressive Complex 2 (PRC2), or a combination thereof.

BACKGROUND OF THE INVENTION

The site specific lysine methylation on histones is one of the important epigenetic mechanisms in controlling and mediating many fundamental biological processes. The Polycomb Repressive Complex 2 (PRC2) methylates the histone H3 lysine 27 (H3K27) at the genomic region of target genes, and thereby represses gene transcription. PRC2 requires minimally three core subunits including SUZ12 (suppressor of zeste 12), EED (embryonic ectoderm development) and the catalytic subunit EZH1 or EZH2 (enhancer of zeste homolog 1/2). EZH1 and EZH2 are homolog proteins and can both be integrated into PRC2 respectively, although with different tissue- and temporal distribution. In PRC2, EZH2 can directly bind the cofactor S-adenosyl methionine (SAM) and transfer the methyl group to histone H3K27 site to form mono-, di-, and tri-methylated lysine (H3K27me1, H3K27me2 and H3K27me3), which repress gene transcription. PRC2-EZH2 has higher activity than PRC2-EZH1, which predominantly catalyzes formation of H3K27me1 and some H3K27me2. EED may bind H3K27me2/3 and allosterically activate enzyme activity of PRC2 to promote spreading of the repressive marks.

EZH2 plays a critical function in development and adult tissue homeostasis, and is closely associated with many diseases. EZH2, SUZ12 and EED are overexpressed in many cancers, including but not limited to breast cancer, prostate cancer and hepatocellular carcinoma. EZH2 activating mutations, which lead to increased H3K27me3, have been identified in DLBCL (diffuse large B cell lymphoma), FL (follicular lymphoma), melanoma, and parathyroid adenocarcinoma patients. Inhibition of PRC2 methyltransferase activity by compounds competing with the cofactor SAM or binding directly to EED in DLBCL reverses high H3K27me3 state, re-activates expression of target genes and inhibits tumor growth/proliferation. Furthermore, EZH2 inhibitors may release the repression of Th1 chemokines in tumor cells and enhance T cell infiltration in ovarian and colorectal cancers.

Therefore, EZH2 provides a pharmacological target for DLBCL and other cancers. In addition, EZH2 also plays important roles in auto-immune diseases and other disorders. Together, there is a high need for small molecules that inhibit the activity of EZH2.

SUMMARY OF THE INVENTION

The present invention provides compounds that inhibit EZH2; and compositions and methods for treating or preventing a disease or condition mediated by EZH2, PRC2, or a combination thereof.

In one aspect, the present invention provides a compound of Formula (I), or a stereoisomer, enantiomer, enantiomeric mixture or pharmaceutically acceptable salt thereof:

Formula (I)

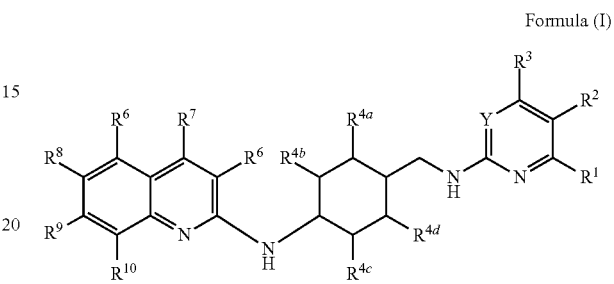

wherein:

Y is N or $CR^a$;

$R^a$, $R^1$, $R^3$, $R^5$, $R^6$, $R^7$, $R^8$ and $R^5$ are independently is H, halogen or $-C_1-C_4$ alkyl;

$R^2$ is $-CN$, $-C_1-C_8$alkyl, -hydroxy$C_1-C_4$ alkylene, $-C_1-C_4$ alkoxy, $-C_2-C_4$ alkoxy substituted with 1-2 hydroxyl;

$-(CR^{13}R^{14})_nC(=O)NR^{11}R^{12}$, $-(CR^{13}R^{14})_nC(=O)NR^{11}R^{15}$;

$-(CR^{13}R^{14})_nC(=O)R^{15}$;

$-(CR^2)_nNR^{11}C(=O)$ $R^{15}$, $-(CR^2)_nNR^{11}(CR^2)_2C(=O)R^{15}$;

$-(CR^2)_nNR-C(=O)OR^{11}$, $-(CR^2)_nNR-C(=O)O-(CR^2)-R^{15}$;

$-NR-C(=O)(CR^2)_2C(=O)R^{15}$, $-NR-C(=O)R^{11}$;

$-(CR^2)_nNR^{11}R^{12}$, $-(CR^2)_nNR^{11}(CR^2), R^{15}$;

$-(CR^2)_nOR^{15}$, $-(CR^2) NR^{15}$;

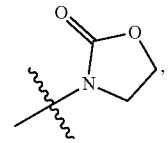 [SMILES: *N1CCOC1=O]

or a 5- to 6-membered heteroaryl having 1 to 4 heteroatoms independently selected from O, S and N;

$R^{4a}$, $R^{4b}$, $R^{4c}$ and $R^{4d}$ are independently H or $-C_1-C_4$ alkyl;

$R^{10}$ is H, halogen, $-C_1-C_4$ alkyl, $-C_1-C_4$ alkoxy, $-C_1-C_4$ haloalkoxy or $-NH(C_1-C_4$ alkyl);

$R^{11}$ is H, $-C_1-C_4$ alkyl, -hydroxy$C_1-C_4$ alkylene, -cyano$C_1-C_4$ alkylene or $-C_1-C_4$ alkyl substituted with $-C_1-C_4$ alkoxy;

$R^{12}$ is H or $-C_1-C_4$ alkyl;

$R^{13}$ is H, halogen, $-CN$, $-OH$, $-C_1-C_4$ alkyl or -hydroxy$C_1-C_4$ alkylene;

$R^{14}$ is H, halogen or $-C_1-C_4$ alkyl;

$R^{15}$ is

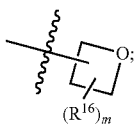

—$C_3$-$C_6$cycloalkyl, or a 4- to 6-membered heterocycoalkyl having 1-2 heteroatoms independently selected from O, S, S(=O)2, and N; wherein said-$C_3$-$C_6$cycloalkyl or 4- to 6-membered heterocycloalkyl of $R^{15}$ is unsubstituted or substituted with 1-2 substituents selected from —OH, —$C_1$-$C_4$ alkyl, -hydroxy$C_1$-$C_4$ alkylene, —$C_1$-$C_4$ alkoxy, —$SO_2$ ($C_1$-$C_4$ alkyl) and —N($C_1$-$C_4$ alkyl)$_2$;

$R^{16}$, if present, is a substituent selected from halogen, —CN, —OH, —$C_1$-$C_4$ alkyl and -hydroxy$C_1$-$C_4$ alkylene;

each R is independently H or —$C_1$-$C_4$ alkyl;

m is 0, 1 or 2; and each n is independently selected from 0, 1 and 2.

In another aspect, the invention provides a pharmaceutical composition comprising a compound of Formula (I) or sub-formulae thereof, or a stereoisomer, enantiomer, enantiomeric mixture or pharmaceutically acceptable salt thereof; and one or more pharmaceutically acceptable carriers.

In yet another aspect, the invention provides a combination, in particular a pharmaceutical combination, comprising a compound of Formula (I) or sub-formulae thereof, or a stereoisomer, enantiomer, enantiomeric mixture or pharmaceutically acceptable salt thereof; and one or more therapeutically active agent(s).

The compounds of the invention, alone or in combination with one or more therapeutically active agent(s), can be used for treating or preventing a disease or condition mediated by EZH2, PRC2 or a combination thereof.

DETAILED DESCRIPTION OF THE INVENTION

The present invention provides compositions and methods for treating or preventing a disease or condition mediated by EZH2, PRC2 or a combination thereof.

Definitions

For purposes of interpreting this specification, the following definitions will apply and whenever appropriate, terms used in the singular will also include the plural and vice versa. As used herein, the term "—$C_1$-$C_6$ alkyl" or "—$C_{1-6}$ alkyl" refer to a straight or branched hydrocarbon chain radical consisting solely of carbon and hydrogen atoms, containing no unsaturation, having from one to six carbon atoms, and which is attached to the rest of the molecule by a single bond. The term "—$C_1$-$C_4$ alkyl" or "—$C_{1-4}$ alkyl" are to be construed accordingly. Examples of —$C_1$-$C_6$ alkyl include, but are not limited to, methyl, ethyl, n-propyl, 1-methylethyl (iso-propyl), n-butyl, n-pentyl and 1,1-dimethylethyl (t-butyl).

As used herein, the term "—$C_1$-$C_4$ alkoxy" refers to a radical of the formula —$OR_a$ where $R_a$ is a $C_{1-4}$alkyl radical as generally defined above. Examples of $C_{1-6}$alkoxy include, but are not limited to, methoxy, ethoxy, propoxy, iso-propoxy, butoxy, isobutoxy, pentoxy, and hexoxy.

The term "cycloalkyl," as used herein, refers to a saturated, monocyclic, fused bicyclic, fused tricyclic or bridged polycyclic ring system. Non-limiting examples of fused bicyclic or bridged polycyclic ring systems include bicyclo [1.1.1]pentane, bicyclo[2.1.1]hexane, bicyclo[2.2.1]heptane, bicyclo[3.1.1]heptane, bicyclo[3.2.1]octane, bicyclo [2.2.2]octane and adamantanyl. As used herein, the term "$C_3$-$C_6$cycloalkyl", refers to a saturated monocyclic group having at least 3, and at most 6, carbon atoms. Non-limiting examples of such "$C_3$-$C_6$cycloalkyl" groups include cyclopropyl, cyclobutyl, cyclopentyl and cyclohexyl groups. "Halo" or "halogen" refer to bromo, chloro, fluoro or iodo.

As used herein, the term "-hydroxy$C_{1-4}$alkylene" refers to a —$C_{1-4}$alkyl radical as defined above, wherein one of the hydrogen atoms of the $C_{1-4}$alkyl radical is replaced by OH. Examples of hydroxy$C_{1-4}$alkyl include, but are not limited to, ethan-1-olyl, 2-methylpropan-1-olyl, hydroxy-methyl, 2-hydroxy-ethyl, 2-hydroxy-propyl and 3-hydroxy-propyl.

As used herein, the term "-cyano$C_{1-4}$ alkylene" refers to a —$C_{1-4}$alkyl radical as defined above, wherein one of the hydrogen atoms of the —$C_{1-4}$alkyl radical is replaced by CN.

The term "haloalkoxy", as used herein, refers to a haloalkyl linked to an oxygen, which may also be represented as —O—R', wherein the R' represents the haloalkyl group. "$C_1$-$C_4$ haloalkoxy" is intended to include $C_1$, $C_2$, $C_3$ and $C_4$ haloalkoxy groups. Examples of haloalkoxy groups include, but are not limited to, fluoromethoxy, difluoromethoxy, trifluoromethoxy, chloromethoxy, dichloromethoxy, trichloromethoxy, pentafluoroethoxy, pentachloroethoxy, 2,2,2-trifluoroethoxy, heptafluoropropoxy, heptachloropropoxy, difluorochloromethoxy, dichlorofluoromethoxy, difluoroethoxy, trifluoroethoxy, difluoropropoxy, dichloroethoxy and dichloropropoxy.

As used herein, the term "heterocyclyl" or "heterocyclic" refers to a stable 4-7 membered non-aromatic monocyclic ring radical comprising 1, 2, or 3, heteroatoms individually selected from nitrogen, oxygen and sulfur. The heterocyclyl radical may be bonded via a carbon atom or heteroatom. The term "5-6 membered heterocyclyl" is to be construed accordingly. Examples of heterocyclyl include, but are not limited to, azetidinyl, oxetanyl, pyrrolinyl, pyrrolidyl, tetrahydrofuryl, tetrahydrothienyl, piperidyl, piperazinyl, tetrahydropyranyl or morpholinyl or perhydroazepinyl.

As used herein, the term "heterocyclyl$C_{0-8}$alkyl" refers to a heterocyclic ring as defined above which is attached to the rest of the molecule by a single bond or by a $C_{1-6}$alkyl radical as defined above.

As used herein, the term "heteroaryl" refers to a 5-9 membered aromatic monocyclic or fused ring radical comprising 1, 2, 3 or 4 heteroatoms individually selected from nitrogen, oxygen and sulfur. The heteroaryl radical may be bonded via a carbon atom or heteroatom.

The term "5-6 membered heteroaryl" is to be construed accordingly. Examples of 5-6 membered monocyclic heteroaryls include, but are not limited to, furyl, pyrrolyl, thienyl, pyrazolyl, imidazolyl, thiazolyl, isothiazolyl, oxazolyl, isoxazolyl, triazolyl, tetrazolyl, pyrazinyl, pyridazinyl, pyrimidyl or pyridyl. Examples of fused heteroaryls include but are not limited to 9-membered heteroaryls such as benzofuranyl; 2,3-dihydrobenzofuranyl, 1,3-dihydroisobenzofuranyl; benzo[d][1,3]dioxol-5-yl; imidazo[1,2-a]pyridinyl; pyrazolo[1,5-a]pyridineyl; 1H-indazolyl and 1H-benzo[d]-imidazolyl.

"EZH2" refers to Enhancer of Zeste Homolog 2.

"PRC2" refers to Polycomb Repressive Complex 2.

The term "PRC2-mediated disease or condition" refers to a disease or condition that is directly or indirectly regulated by PRC2. This includes, but is not limited to, any disease or condition which is directly or indirectly regulated by EZH2.

The term "disease or condition mediated by Enhancer of Zeste Homolog (EZH2), Polycomb Repressive Complex 2 (PRC2), or a combination of Enhancer of Zeste Homolog 2 (EZH2) and Polycomb Repressive Complex 2 (PRC2)" or the term "disease or condition mediated by EZH2, PRC2 or EZH2/PRC2" refer to a disease or condition that is directly or indirectly regulated by EZH2, PRC2 or EZH2 and PRC2.

As used herein, the term "subject" refers to mammals, primates (e.g., humans, male or female), dogs, rabbits, guinea pigs, pigs, rats and mice. In certain embodiments, the subject is a primate. In yet other embodiments, the subject is a human.

As used herein, the term "inhibit", "inhibition" or "inhibiting" refers to the reduction or suppression of a given condition, symptom, or disorder, or disease, or a significant decrease in the baseline activity of a biological activity or process.

As used herein, the term "treat", "treating" or "treatment" of any disease or disorder refers to alleviating or ameliorating the disease or disorder (i.e., slowing or arresting the development of the disease or at least one of the clinical symptoms thereof); or alleviating or ameliorating at least one physical parameter or biomarker associated with the disease or disorder, including those which may not be discernible to the patient.

As used herein, the term "prevent", "preventing" or "prevention" of any disease or disorder refers to the prophylactic treatment of the disease or disorder; or delaying the onset or progression of the disease or disorder As used herein, a subject is "in need of" a treatment if such subject would benefit biologically, medically or in quality of life from such treatment.

As used herein, the term "a therapeutically effective amount" of a compound of the present invention refers to an amount of the compound of the present invention that will elicit the biological or medical response of a subject, for example, reduction or inhibition of an enzyme or a protein activity, or ameliorate symptoms, alleviate conditions, slow or delay disease progression, or prevent a disease, etc.

As used herein, the term "pharmaceutical composition" refers to a compound of the invention, or a pharmaceutically acceptable salt thereof, together with at least one pharmaceutically acceptable carrier, in a form suitable for oral or parenteral administration.

As used herein, the term "pharmaceutically acceptable carrier" refers to a substance useful in the preparation or use of a pharmaceutical composition and includes, for example, suitable diluents, solvents, dispersion media, surfactants, antioxidants, preservatives, isotonic agents, buffering agents, emulsifiers, absorption delaying agents, salts, drug stabilizers, binders, excipients, disintegration agents, lubricants, wetting agents, sweetening agents, flavoring agents, dyes, and combinations thereof, as would be known to those skilled in the art (see, for example, Remington The Science and Practice of Pharmacy, 22$^{nd}$ Ed. Pharmaceutical Press, 2013, pp. 1049-1070).

As used herein, the term "a," "an," "the" and similar terms used in the context of the present invention (especially in the context of the claims) are to be construed to cover both the singular and plural unless otherwise indicated herein or clearly contradicted by the context.

Description of Preferred Embodiments

The present invention provides compounds that inhibit EZH2; and compositions and methods for treating or preventing a condition mediated by EZH2, PRC2 or a combination thereof.

Various enumerated embodiments of the invention are described herein. Features specified in each embodiment may be combined with other specified features to provide further embodiments of the present invention.

Embodiment 1. A compound of Formula (I), or a stereoisomer, enantiomer, enantiomeric mixture or a pharmaceutically acceptable salt thereof; as described above.

Embodiment 2. A compound according to Embodiment 1, wherein said compound is of Formula (1-1), or a stereoisomer, enantiomer, enantiomeric mixture or a pharmaceutically acceptable salt thereof;

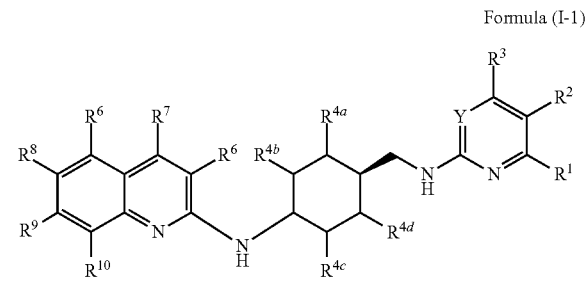

Formula (I-1)

wherein $R^1$, $R^2$, $R^3$, $R^4$, $R^{4b}$, $R^{4c}$, $R^{4d}$ $R^5$, $R^6$, $R^7$, $R^8$, $R^9$ and $R^{10}$ are as defined in Formula (1).

Embodiment 3. A compound according to Embodiment 1, wherein said compound is of Formula (1-2), or a stereoisomer, enantiomer, enantiomeric mixture or a pharmaceutically acceptable salt thereof;

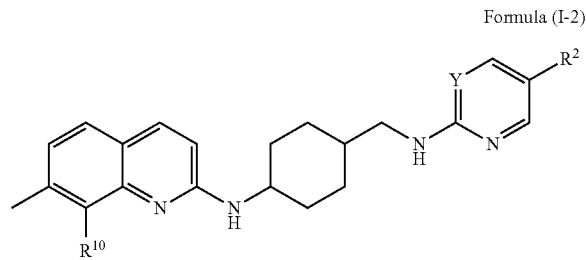

Formula (I-2)

wherein Y, $R^2$ and $R^{1o}$ are as defined in Formula (1).

Embodiment 4. A compound according to Embodiment 1, wherein said compound is of Formula (I-3), or a stereoisomer, enantiomer, enantiomeric mixture or a pharmaceutically acceptable salt thereof;

Formula (I-3)

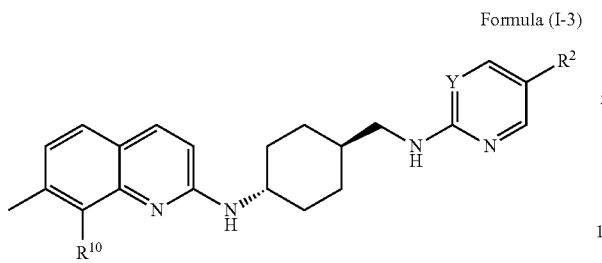

wherein Y, R² and R¹° are as defined in Formula (1).

Embodiment 5. A compound according to Embodiment 1, wherein said compound is of Formula (I-4), or a stereoisomer, enantiomer, enantiomeric mixture or a pharmaceutically acceptable salt thereof;

Formula (I-4)

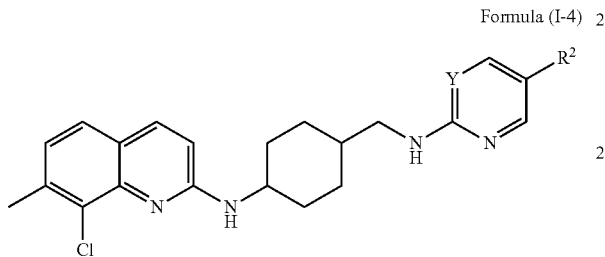

wherein Y and R² are as defined in Formula (1).

Embodiment 6. A compound according to Embodiment 1, wherein said compound is of Formula (I-5), or a stereoisomer, enantiomer, enantiomeric mixture or a pharmaceutically acceptable salt thereof;

Formula (I-5)

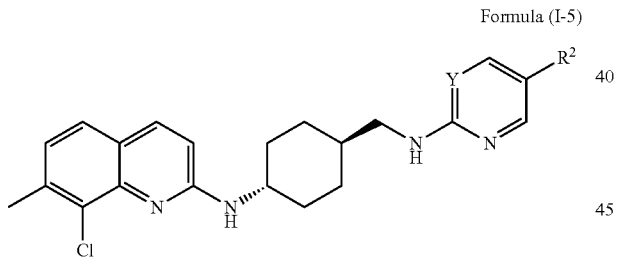

wherein Y and R² are as defined in Formula (1).

Embodiment 7. A compound according to Embodiment 1, wherein said compound is of Formula (I-6), or a stereoisomer, enantiomer, enantiomeric mixture or a pharmaceutically acceptable salt thereof;

Formula (I-6)

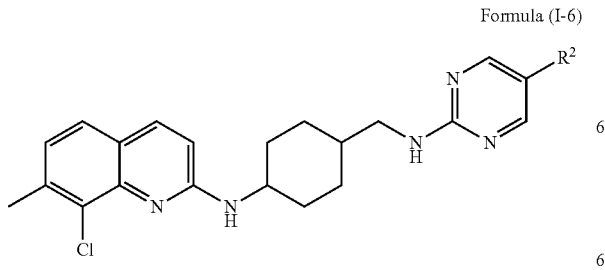

wherein R² is as defined in Formula (1).

Embodiment 8. A compound according to Embodiment 1, wherein said compound is of Formula (I-7), or a stereoisomer, enantiomer, enantiomeric mixture or a pharmaceutically acceptable salt thereof;

Formula (I-7)

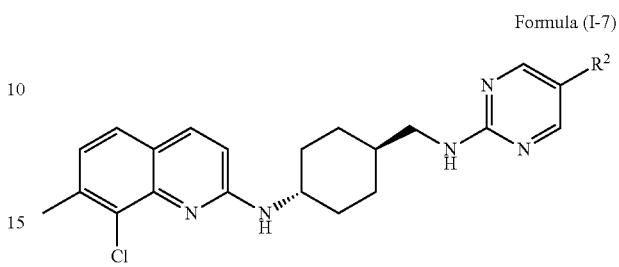

wherein R² is as defined in Formula (1).

Embodiment 9. A compound according to any one of Embodiments 1-8, or a stereoisomer, enantiomer, enantiomeric mixture or a pharmaceutically acceptable salt thereof, wherein R² is —CN, —NH₂, —C(=O)NH₂, triazolyl,

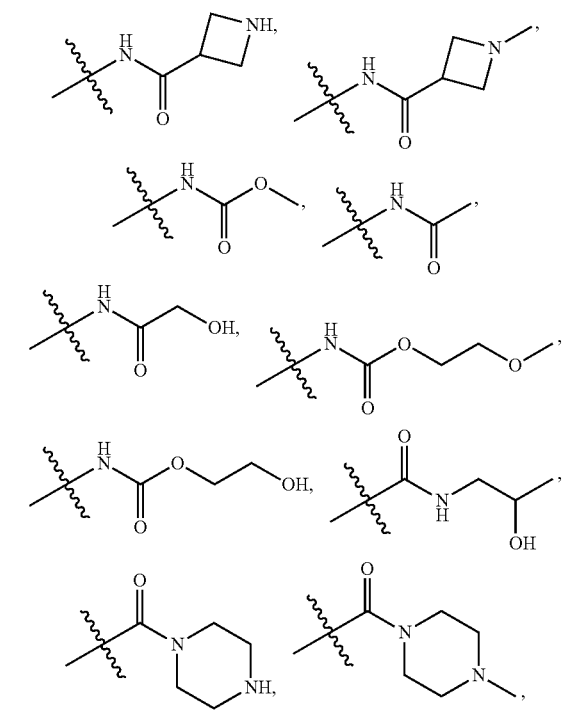

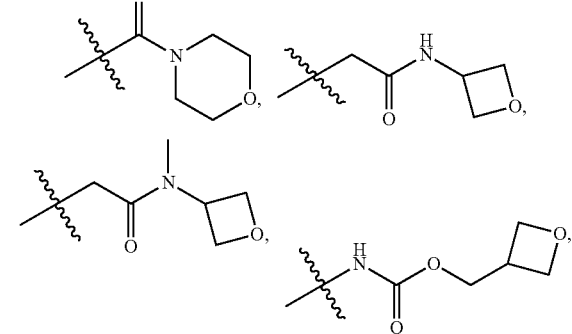

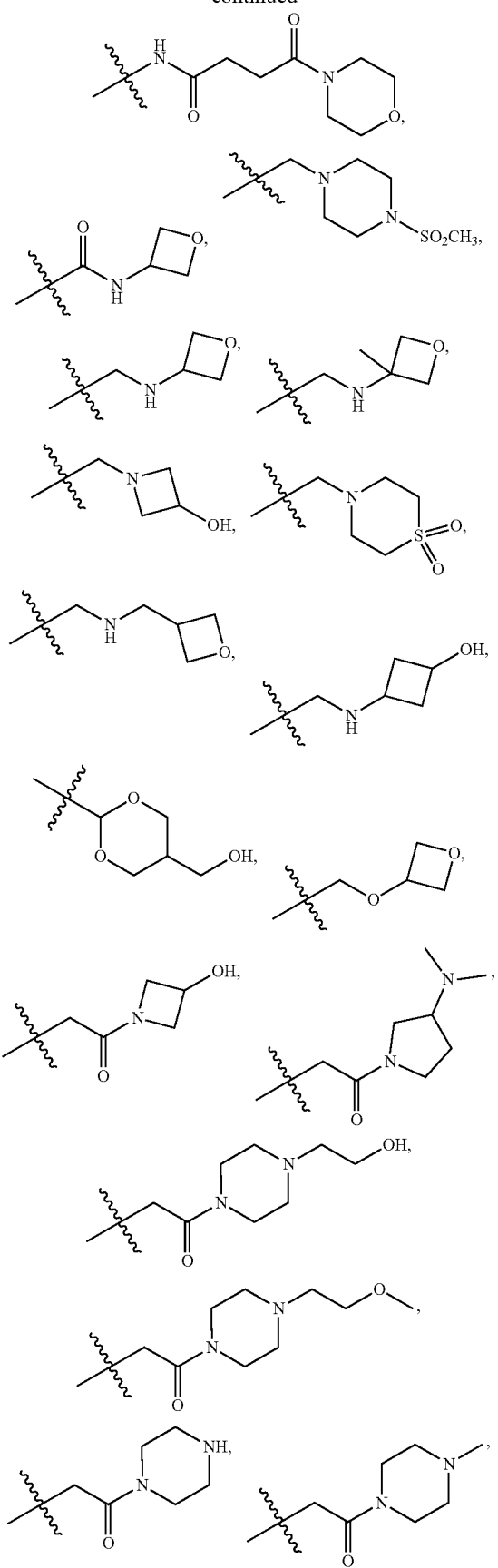
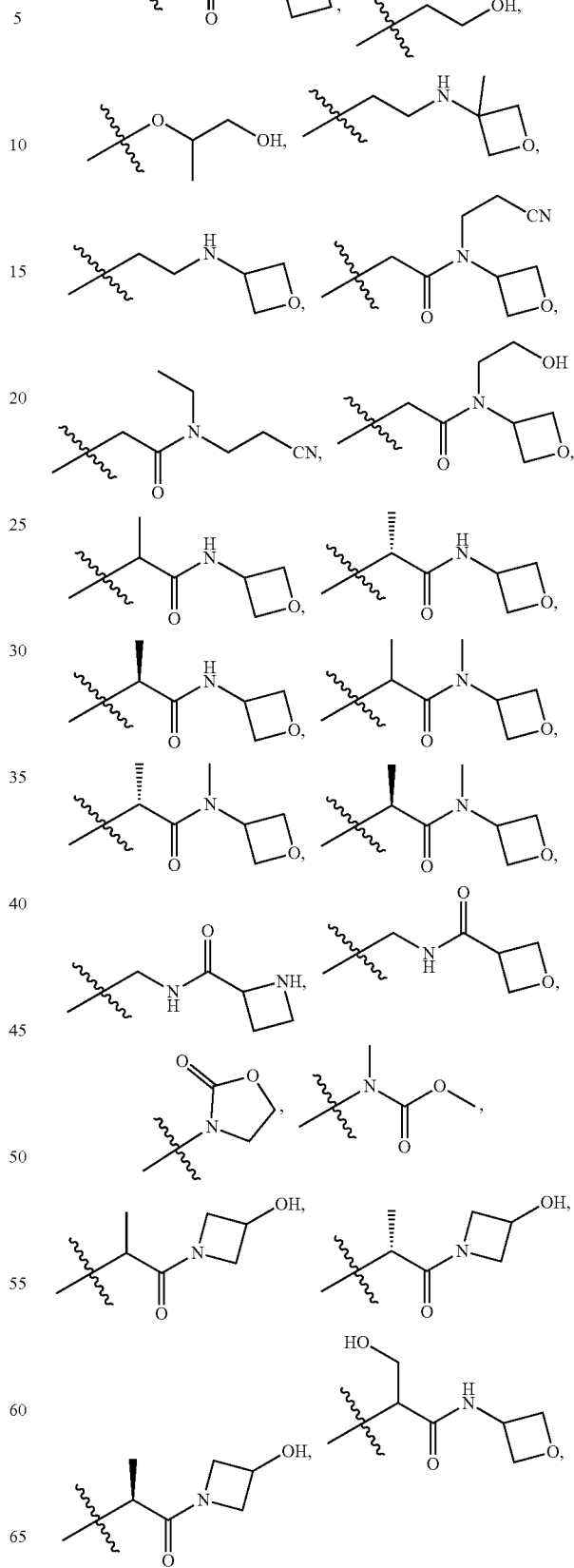

-continued

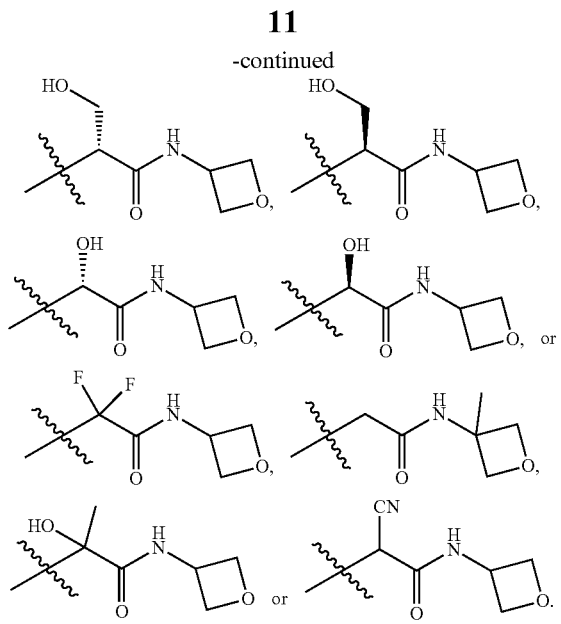

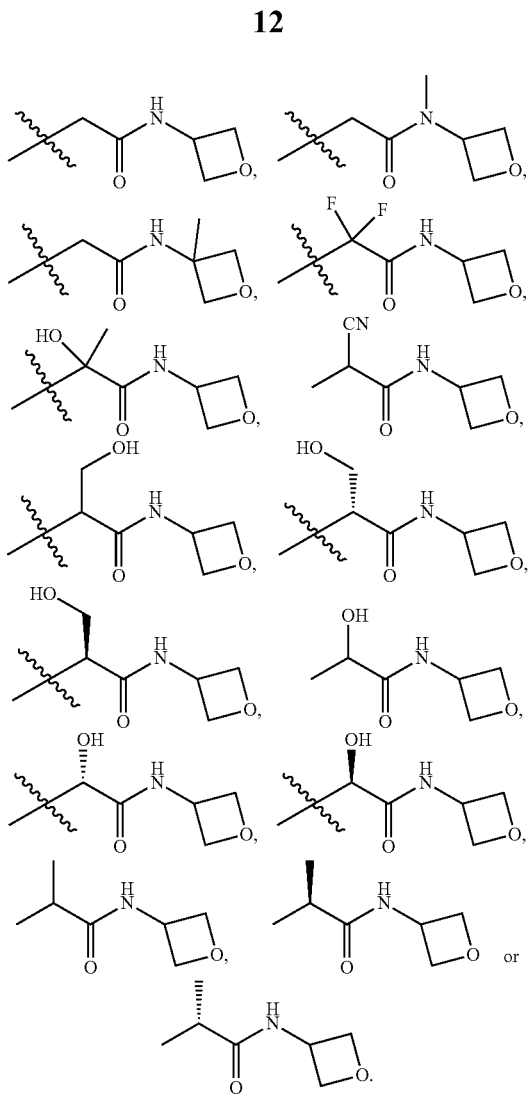

Embodiment 10. A compound according to any one of Embodiments 1-8, or a stereoisomer, enantiomer, enantiomeric mixture or a pharmaceutically acceptable salt thereof; wherein $R^2$ is $-(CH_2)_{1-2}C(=O)NR^{11}R^{15}$ or $-(CR^{13}R^{14})-C(=O)NR^{11}R^{15}$.

Embodiment 11. A compound according to Embodiment 10, or a stereoisomer, enantiomer, enantiomeric mixture or a pharmaceutically acceptable salt thereof; wherein $R^{15}$ is a 4- to 6-membered heterocycoalkyl having 1-2 heteroatoms independently selected from O, S and N; wherein said 4- to 6-membered heterocycloalkyl is unsubstituted or substituted with 1-2 substituents selected from —OH, —$C_1$-$C_4$ alkyl, -hydroxy$C_1$-$C_4$ alkylene, —$C_1$-$C_4$ alkoxy, —$SO_2$ ($C_1$-$C_4$ alkyl) and —N($C_1$-$C_4$ alkyl) 2;

Embodiment 12. A compound according to Embodiment 10 or 11, or a stereoisomer, enantiomer, enantiomeric mixture or a pharmaceutically acceptable salt thereof; wherein $R^{15}$ is

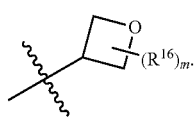

In a particular embodiment, $R^{15}$ is

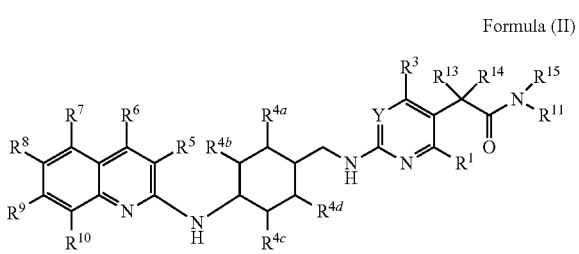

Embodiment 13. A compound according to Embodiment 12, wherein m is 1; and $R^{16}$ is —$C_1$-$C_4$ alkyl.

Embodiment 14. A compound according to any one of Embodiments 1-13, or a stereoisomer, enantiomer, enantiomeric mixture or a pharmaceutically acceptable salt thereof; wherein $R^2$ is Embodiment 15. A compound according to Embodiment 1, wherein said compound is of Formula (II), or a stereoisomer, enantiomer, enantiomeric mixture or a pharmaceutically acceptable salt thereof;

Formula (II)

wherein:
Y is CH or N;
$R^1$, $R^3$, $R^{4a}$, $R^{4b}$, $R^{4c}$, $R^{4d}$ and $R^{11}$ are independently H or $C_1$-$C_4$ alkyl;
$R^5$, $R^6$, $R^7$, $R^8$, $R^9$ and $R^{10}$ are independently is H, halogen or $C_1$-$C_4$ alkyl;
$R^{13}$ is H, halogen, —CN, —OH, —$C_1$-$C_4$ alkyl or -hydroxy$C_1$-$C_4$ alkylene;
$R^{14}$ is H, halogen or —$C_1$-$C_4$ alkyl;

$R^{15}$ is a 4- to 6-membered heterocycoalkyl having 1-2 heteroatoms independently selected from O, S and N; and wherein $R^{15}$ is unsubstituted or substituted with 1-2 substituents selected from —OH, —$C_1$-$C_4$ alkyl, -hydroxy$C_1$-$C_4$ alkylene, —$C_1$-$C_4$ alkoxy, —$SO_2$ ($C_1$-$C_4$ alkyl) and —$N(C_1$-$C_4$ alkyl) 2.

Embodiment 16. A compound according to Embodiment 15, wherein said compound is of Formula (II-1), or a stereoisomer, enantiomer, enantiomeric mixture or a pharmaceutically acceptable salt thereof;

Formula (II-1)

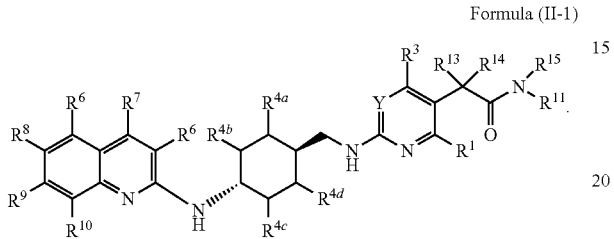

Embodiment 17. A compound according to Embodiment 15, wherein said compound is of Formula (II-2), or a stereoisomer, enantiomer, enantiomeric mixture or a pharmaceutically acceptable salt thereof;

Formula (II-2)

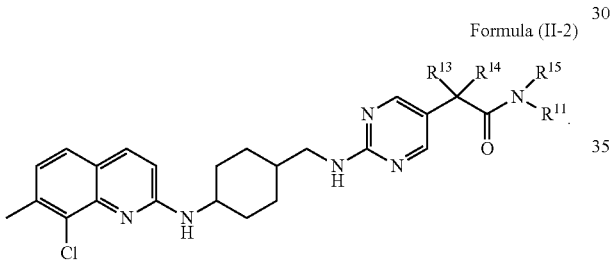

Embodiment 18. A compound according to Embodiment 15, wherein said compound is of Formula (II-3), or a stereoisomer, enantiomer, enantiomeric mixture or a pharmaceutically acceptable salt thereof;

Formula (II-3)

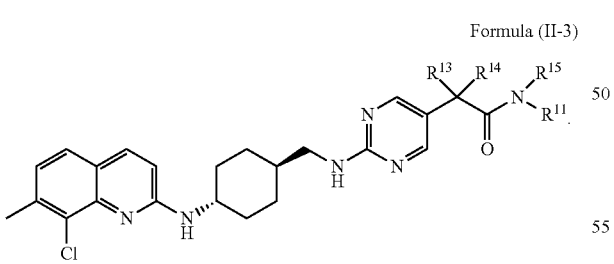

Embodiment 19. A compound according to any one of Embodiments 15-18, or a stereoisomer, enantiomer, enantiomeric mixture or a pharmaceutically acceptable salt thereof; wherein $R^{15}$ is azetidinyl or ozetanyl, each of which is unsubstituted or substituted with —OH, —$C_1$-$C_4$ alkyl or -hydroxy$C_1$-$C_4$ alkylene.

Embodiment 20. A compound according to Embodiment 19, or a stereoisomer, enantiomer, enantiomeric mixture or a pharmaceutically acceptable salt thereof; wherein $R^{15}$ is

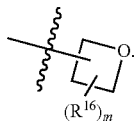

In a particular embodiment, $R^{15}$ is

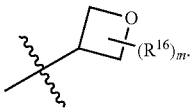

Embodiment 21. A compound according to Embodiment 20, wherein m is 1; and $R^{16}$ is —$C_1$-$C_4$ alkyl.

Embodiment 22. A compound according to Embodiment 1, wherein said compound is selected from:
- 2-(2-(((4-((8-chloro-7-methylquinolin-2-yl)amino)cyclohexyl)methyl)amino)pyrimidin-5-yl)-N-methyl-N-(oxetan-3-yl)acetamide;
- 2-(2-(((4-((8-chloro-7-methylquinolin-2-yl)amino)cyclohexyl)methyl)amino)pyrimidin-5-yl)-2,2-difluoro-N-(oxetan-3-yl)acetamide;
- 2-(2-(((4-((8-chloro-7-methylquinolin-2-yl)amino)cyclohexyl)methyl)amino)pyrimidin-5-yl)-2-hydroxy-N-(oxetan-3-yl)propanamide;
- 2-(2-(((4-((8-chloro-7-methylquinolin-2-yl)amino)cyclohexyl)methyl)amino)pyrimidin-5-yl)-2-cyano-N-(oxetan-3-yl)acetamide;
- 2-(2-(((4-((8-chloro-7-methylquinolin-2-yl)amino)cyclohexyl)methyl)amino)pyrimidin-5-yl)-3-hydroxy-N-(oxetan-3-yl)propanamide;
- 2-(2-(((4-((8-chloro-7-methylquinolin-2-yl)amino)cyclohexyl)methyl)amino)pyrimidin-5-yl)-2-hydroxy-N-(oxetan-3-yl)acetamide;
- 2-(2-(((4-((8-chloro-7-methylquinolin-2-yl)amino)cyclohexyl)methyl)amino)pyrimidin-5-yl)-N-(oxetan-3-yl)propanamide; and
- 2-(6-(((4-((8-chloro-7-methylquinolin-2-yl)amino)cyclohexyl)methyl)amino)pyridin-3-yl)-N-(oxetan-3-yl)acetamide;

or a stereoisomer, enantiomer, enantiomeric mixture or a pharmaceutically acceptable salt thereof.

Embodiment 23. A compound according to Embodiment 1, wherein said compound is selected from:
- 2-(2-((((1r,4r)-4-((8-chloro-7-methylquinolin-2-yl)amino)cyclohexyl)methyl)amino)pyrimidin-5-yl)-N-methyl-N-(oxetan-3-yl)acetamide;
- 2-(2-((((1r,4r)-4-((8-chloro-7-methylquinolin-2-yl)amino)cyclohexyl)methyl)amino)pyrimidin-5-yl)-2,2-difluoro-N-(oxetan-3-yl)acetamide;
- 2-(2-((((1r,4r)-4-((8-chloro-7-methylquinolin-2-yl)amino)cyclohexyl)methyl)amino)pyrimidin-5-yl)-2-hydroxy-N-(oxetan-3-yl)propanamide;
- 2-(2-((((1r,4r)-4-((8-chloro-7-methylquinolin-2-yl)amino)cyclohexyl)methyl)amino)pyrimidin-5-yl)-2-cyano-N-(oxetan-3-yl)acetamide;
- 2-(2-((((1r,4r)-4-((8-chloro-7-methylquinolin-2-yl)amino)cyclohexyl)methyl)amino)pyrimidin-5-yl)-3-hydroxy-N-(oxetan-3-yl)propanamide;
- (S)-2-(2-((((1r,4S)-4-((8-chloro-7-methylquinolin-2-yl)amino)cyclohexyl)methyl)amino)pyrimidin-5-yl)-3-hydroxy-N-(oxetan-3-yl)propanamide;

(R)-2-(2-((((1r,4R)-4-((8-chloro-7-methylquinolin-2-yl)
amino)cyclohexyl)methyl)amino)pyrimidin-5-yl)-3-
hydroxy-N-(oxetan-3-yl)propanamide;

2-(2-((((1r,4r)-4-((8-chloro-7-methylquinolin-2-yl)
amino)cyclohexyl)methyl)amino)pyrimidin-5-yl)-2-
hydroxy-N-(oxetan-3-yl)acetamide;

(S)-2-(2-((((1r,4S)-4-((8-chloro-7-methylquinolin-2-yl)
amino)cyclohexyl)methyl)amino)pyrimidin-5-yl)-2-
hydroxy-N-(oxetan-3-yl)acetamide;

(R)-2-(2-((((1r,4R)-4-((8-chloro-7-methylquinolin-2-yl)
amino)cyclohexyl)methyl)amino)pyrimidin-5-yl)-2-
hydroxy-N-(oxetan-3-yl)acetamide;

2-(2-((((1r,4r)-4-((8-chloro-7-methylquinolin-2-yl)
amino)cyclohexyl)methyl)amino)pyrimidin-5-yl)-N-
(oxetan-3-yl)propanamide;

(S)-2-(2-((((1r,4S)-4-((8-chloro-7-methylquinolin-2-yl)
amino)cyclohexyl)methyl)amino)pyrimidin-5-yl)-N-
(oxetan-3-yl)propanamide;

(R)-2-(2-((((1r,4R)-4-((8-chloro-7-methylquinolin-2-yl)
amino)cyclohexyl)methyl)amino)pyrimidin-5-yl)-N-
(oxetan-3-yl)propanamide; and 2-(6-((((1r,4r)-4-((8-chloro-7-methylquinolin-2-yl)
amino)cyclohexyl)methyl)amino)pyridin-3-yl)-N-
(oxetan-3-yl)acetamide;

or an enantiomeric mixture or pharmaceutically acceptable salt thereof.

Embodiment 24. A compound according to Embodiment 1, wherein said compound is 2-(2-(((4-((8-chloro-7-methylquinolin-2-yl)amino)cyclohexyl)methyl)amino)pyrimidin-5-yl)-N-(oxetan-3-yl)acetamide; or a stereoisomer, enantiomer, enantiomeric mixture or a pharmaceutically acceptable salt thereof.

Embodiment 25. A compound according to Embodiment 24, wherein said compound is 2-(2-((((1R,4R)-4-((8-chloro-7-methylquinolin-2-yl)amino)cyclohexyl)methyl)amino)pyrimidin-5-yl)-N-(oxetan-3-yl)acetamide; or an enantiomeric mixture or pharmaceutically acceptable salt thereof.

Embodiment 26. A compound according to Embodiment 1, wherein said compound is 2-(2-(((4-((8-chloro-7-methylquinolin-2-yl)amino)cyclohexyl)methyl)amino)pyrimidin-5-yl)-N-(oxetan-3-yl)propanamide; or a stereoisomer, enantiomer, enantiomeric mixture or a pharmaceutically acceptable salt thereof.

Embodiment 27. A compound according to Embodiment 26, wherein said compound is(S)-2-(2-((((1r,4S)-4-((8-chloro-7-methylquinolin-2-yl)amino)cyclohexyl)methyl)amino)pyrimidin-5-yl)-N-(oxetan-3-yl)propanamide or (R)-2-(2-((((1r,4R)-4-((8-chloro-7-methylquinolin-2-yl)amino)cyclohexyl)methyl)amino)pyrimidin-5-yl)-N-(oxetan-3-yl)propanamide; or an enantiomeric mixture or pharmaceutically acceptable salt thereof.

Embodiment 28. A compound according to Embodiment 1, wherein said compound is 2-(6-(((4-((8-chloro-7-methylquinolin-2-yl)amino)cyclohexyl)methyl)amino)pyridin-3-yl)-N-(oxetan-3-yl)acetamide; or a stereoisomer, enantiomer, enantiomeric mixture or a pharmaceutically acceptable salt thereof.

Embodiment 29. A compound according to Embodiment 25, wherein said compound is 2-(6-((((1r,4r)-4-((8-chloro-7-methylquinolin-2-yl)amino)cyclohexyl)methyl)amino)pyridin-3-yl)-N-(oxetan-3-yl)acetamide; or an enantiomeric mixture or pharmaceutically acceptable salt thereof.

Embodiment 30. A pharmaceutical composition comprising a compound according to any one of Embodiments 1-29 and one or more pharmaceutically acceptable carrier.

Embodiment 31. A combination comprising a compound according to any one of Embodiments 1-29 and one or more additional therapeutically active agent.

Embodiment 32. The combination according to Embodiment 31, wherein said one or more additional therapeutically active agent is an anti-cancer agent, an analgesic, an anti-inflammatory agent, immunomodulator, or a combination thereof.

Embodiment 33. A compound according to any one of Embodiments 1-29 and optionally in combination with a second therapeutic agent, for use in treating a disease or condition mediated by EZH2. PRC2 or EZH2/PRC2.

Embodiment 34. The compound according to Embodiment 33, wherein said second therapeutic agent is an anti-cancer agent, an analgesic, an anti-inflammatory agent or a combination thereof.

Embodiment 35. Use of a compound according to any one of Embodiments 1-29 and optionally in combination with a second therapeutic agent, in the manufacture of a medicament for a disease or condition mediated by EZH2, PRC2 or EZH2/PRC2.

Embodiment 36. A method for treating a disease or condition mediated by EZH2, PRC2 or EZH2/PRC2, comprising administering to a subject in need thereof, a therapeutically effective amount of a compound according to any one of Embodiments 1-29 and optionally in combination with a second therapeutic agent; thereby treating said disease or condition mediated by EZH2, PRC2 or EZH2/PRC2.

Embodiment 37. A method for treating a disease or condition that benefit from or is treatable by inhibition of EZH2, PRC2 or EZH2/PRC2, comprising administering to a subject in need thereof, a therapeutically effective amount of a compound according to any one of Embodiments 1-29 and optionally in combination with a second therapeutic agent; thereby treating said disease or condition that benefit from or is treatable by inhibition by EZH2, PRC2, or EZH2/PRC2.

Embodiment 38. The use of a compound according to Embodiment 35, or the method according to Embodiment 36 or 37, wherein said disease or condition mediated by EZH2, PRC2 or EZH2/PRC2, or said disease or condition that benefit from or is treatable by inhibition of EZH2, PRC2 or EZH2/PRC2, is diffuse large B cell lymphoma (DLBCL), follicular lymphoma, leukemia, multiple myeloma, gastric cancer, malignant rhabdoid tumor, hepatocellular carcinoma, prostate cancer, breast carcinoma, bile duct and gallbladder cancers, bladder carcinoma, neuroblastoma, glioma, glioblastoma and astrocytoma, cervical cancer, colon cancer, melanoma, endometrial cancer, esophageal cancer, head and neck cancer, lung cancer, nasopharyngeal carcinoma, ovarian cancer, pancreatic cancer, renal cell carcinoma, rectal cancer, thyroid cancers, parathyroid tumors, uterine tumors, rhabdomyosarcoma, Kaposi sarcoma, synovial sarcoma, osteosarcoma and Ewing's sarcoma.

Embodiment 39. The use of a compound according to Embodiment 35, or the method according to Embodiment 36 or 37, wherein said disease or condition mediated by EZH2, PRC2 or EZH2/PRC2, or said disease or condition that benefit from or is treatable by inhibition of EZH2, PRC2 or EZH2/PRC2, is diffuse large B cell lymphoma (DLBCL), follicular lymphoma, leukemia, multiple myeloma, gastric cancer, malignant rhabdoid tumor, and hepatocellular carcinoma.

Embodiment 40. A method for inhibiting EZH2, PRC2 or EHZ2/PRC2, comprising administering a compound according to any one of Embodiments 1-29; thereby inhibiting EZH2, PRC2, or EZH2/PRC2.

Unless specified otherwise, the term "compounds of the present invention" or "compound of the present invention" refers to compounds of Formula (I) subformulae thereof, and exemplified compounds, and salts thereof, as well as all stereoisomers (including diastereoisomers and enantiomers), rotamers, tautomers and isotopically labeled compounds (including deuterium substitutions), as well as inherently formed moieties. The "compounds of the present invention" further includes N-oxide derivatives of such compounds.

Depending on the choice of the starting materials and procedures, the compounds can be present in the form of one of the possible stereoisomers or as mixtures thereof, for example as pure optical isomers, or as stereoisomer mixtures, such as racemates and diastereoisomer mixtures, depending on the number of asymmetric carbon atoms. The present invention is meant to include all such possible stereoisomers, including racemic mixtures, diasteriomeric mixtures and optically pure forms. Optically active (R)- and(S)-stereoisomers may be prepared using chiral synthons or chiral reagents, or resolved using conventional techniques. Substituents at atoms with unsaturated double bonds may, if possible, be present in cis-(Z)- or trans-(E)-form. If the compound contains a disubstituted cycloalkyl, the cycloalkyl substituent may have a cis- or trans-configuration.

Any asymmetric atom (e.g., carbon or the like) of the compound(s) of the present invention can be present in racemic or enantiomerically enriched, for example the (R)-, (S)- or (R,S)-configuration. In certain embodiments, each asymmetric atom has at least 50% enantiomeric excess, at least 60% enantiomeric excess, at least 70% enantiomeric excess, at least 80% enantiomeric excess, at least 90% enantiomeric excess, at least 95% enantiomeric excess, or at least 99% enantiomeric excess in the (R)- or(S)-configuration.

Accordingly, as used herein a compound of the present invention can be in the form of one of the possible stereoisomers, rotamers, atropisomers, tautomers or mixtures thereof, for example, as substantially pure geometric (cis or trans) stereoisomers, diastereomers, optical isomers (antipodes), racemates or mixtures thereof.

Any resulting mixtures of stereoisomers can be separated on the basis of the physicochemical differences of the constituents, into the pure or substantially pure geometric or optical isomers, diastereomers, racemates, for example, by chromatography and/or fractional crystallization.

Any resulting racemates of compounds of the present invention or of intermediates can be resolved into the optical antipodes by known methods, e.g., by separation of the diastereomeric salts thereof, obtained with an optically active acid or base, and liberating the optically active acidic or basic compound. In particular, a basic moiety may thus be employed to resolve the compounds of the present invention into their optical antipodes, e.g., by fractional crystallization of a salt formed with an optically active acid, e.g., tartaric acid, dibenzoyl tartaric acid, diacetyl tartaric acid, di-O,O'-p-toluoyl tartaric acid, mandelic acid, malic acid or camphor-10-sulfonic acid. Racemic compounds of the present invention or racemic intermediates can also be resolved by chiral chromatography, e.g., high pressure liquid chromatography (HPLC) using a chiral adsorbent.

Any formula given herein is also intended to represent unlabeled forms as well as isotopically labeled forms of the compounds. Isotopically labeled compounds have structures depicted by the formulas given herein except that one or more atoms are replaced by an atom having a selected atomic mass or mass number. Isotopes that can be incorporated into compounds of the invention include, for example, isotopes of hydrogen.

Further, incorporation of certain isotopes, particularly deuterium (i.e., $^2H$ or D) may afford certain therapeutic advantages resulting from greater metabolic stability, for example increased in vivo half-life or reduced dosage requirements or an improvement in therapeutic index or tolerability. It is understood that deuterium in this context is regarded as a substituent of a compound of Formula (I) or sub-formulae thereof. The concentration of deuterium, may be defined by the isotopic enrichment factor. The term "isotopic enrichment factor" as used herein means the ratio between the isotopic abundance and the natural abundance of a specified isotope. If a substituent in a compound of this invention is denoted as being deuterium, such compound has an isotopic enrichment factor for each designated deuterium atom of at least 3500 (52.5% deuterium incorporation at each designated deuterium atom), at least 4000 (60% deuterium incorporation), at least 4500 (67.5% deuterium incorporation), at least 5000 (75% deuterium incorporation), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). It should be understood that the term "isotopic enrichment factor" can be applied to any isotope in the same manner as described for deuterium.

Other examples of isotopes that can be incorporated into compounds of the invention include isotopes of hydrogen, carbon, nitrogen, oxygen, phosphorous, fluorine, and chlorine, such as $^3H$, $^{11}C$, $^{13}C$, $^{14}C$, $^{15}N$, $^{18}F$ $^{31}P$, $^{32}P$, $^{35}S$, $^{36}Cl$, $^{123}I$, $^{124}I$, $^{125}I$ respectively. Accordingly it should be understood that the invention includes compounds that incorporate one or more of any of the aforementioned isotopes, including for example, radioactive isotopes, such as $^3H$ and $^{14}C$, or those into which non-radioactive isotopes, such as $^2H$ and $^{13}C$ are present. Such isotopically labelled compounds are useful in metabolic studies (with $^{14}C$), reaction kinetic studies (with, for example $^2H$ or $^3H$), detection or imaging techniques, such as positron emission tomography (PET) or single-photon emission computed tomography (SPECT) including drug or substrate tissue distribution assays, or in radioactive treatment of patients. In particular, an $^{18}F$ or labeled compound may be particularly desirable for PET or SPECT studies. Isotopically-labeled compounds of Formula (I) or sub-formulae thereof can generally be prepared by conventional techniques known to those skilled in the art or by processes analogous to those described in the accompanying examples using an appropriate isotopically-labeled reagents in place of the non-labeled reagent previously employed.

The compounds of the present invention are either obtained in the free form, as a salt thereof. As used herein, the terms "salt" or "salts" refers to an acid addition or base addition salt of a compound of the invention. "Salts" include in particular "pharmaceutical acceptable salts". The term "pharmaceutically acceptable salts" refers to salts that retain the biological effectiveness and properties of the compounds of this invention and, which typically are not biologically or otherwise undesirable. In many cases, the compounds of the present invention are capable of forming acid and/or base salts by virtue of the presence of amino and/or carboxyl groups or groups similar thereto.

Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, oxalic acid, maleic acid, malonic acid, succinic acid, fumaric acid, tartaric acid, citric acid, benzoic acid, mandelic acid, methanesulfonic acid, ethanesulfonic acid, toluenesulfonic acid, sulfosalicylic acid, and the like.

Pharmaceutically acceptable base addition salts can be formed with inorganic and organic bases. Inorganic bases from which salts can be derived include, for example, ammonium salts and metals from columns I to XII of the periodic table. In certain embodiments, the salts are derived from sodium, potassium, ammonium, calcium, magnesium, iron, silver, zinc, and copper; particularly suitable salts include ammonium, potassium, sodium, calcium and magnesium salts. Organic bases from which salts can be derived include, for example, primary, secondary, and tertiary amines, substituted amines including naturally occurring substituted amines, cyclic amines, basic ion exchange resins, and the like. Certain organic amines include isopropylamine, benzathine, cholinate, diethanolamine, diethylamine, lysine, meglumine, piperazine and tromethamine.

In another aspect, the present invention provides compounds of the present invention in acetate, ascorbate, adipate, aspartate, benzoate, besylate, bromide/hydrobromide, bicarbonate/carbonate, bisulfate/sulfate, camphorsulfonate, caprate, chloride/hydrochloride, chlorotheophyllinate, citrate, ethanedisulfonate, fumarate, gluceptate, gluconate, glucuronate, glutamate, glutarate, glycolate, hippurate, hydroiodide/iodide, isethionate, lactate, lactobionate, laurylsulfate, malate, maleate, malonate, mandelate, mesylate, methylsulphate, mucate, naphthoate, napsylate, nicotinate, nitrate, octadecanoate, oleate, oxalate, palmitate, pamoate, phosphate/hydrogen phosphate/dihydrogen phosphate, polygalacturonate, propionate, sebacate, stearate, succinate, sulfosalicylate, sulfate, tartrate, tosylate trifenatate, trifluoroacetate or xinafoate salt form.

Pharmacology and Utility

In one aspect, the invention provides compounds of Formula (I) or subformulae thereof, or a pharmaceutically acceptable salt thereof, that are useful for therapy: particularly, for treating or preventing a disease or condition that is mediated by EZH2, PRC2 or a combination thereof.

In another aspect, the invention provides the use of a compound of Formula (I) or subformulae thereof, or a pharmaceutically acceptable salt thereof, for treating a disease or condition that benefit from or is treatable by inhibition of EZH2, PRC2 or a combination thereof; and for the manufacture of a medicament for treating a disease or condition that is treatable by inhibition of EZH2, PRC2 or a combination thereof.

Examples of diseases or conditions that are mediated by EZH2, PRC2 or EZH2/PRC2, or that benefit from or are treatable by inhibition of EZH2, PRC2 or EZH2/PRC2, include but is not limited to diffuse large B cell lymphoma (DLBCL), follicular lymphoma, leukemia, multiple myeloma, gastric cancer, malignant rhabdoid tumor, hepatocellular carcinoma, prostate cancer, breast carcinoma, bile duct and gallbladder cancers, bladder carcinoma, neuroblastoma, glioma, glioblastoma and astrocytoma, cervical cancer, colon cancer, melanoma, endometrial cancer, esophageal cancer, head and neck cancer, lung cancer, nasopharyngeal carcinoma, ovarian cancer, pancreatic cancer, renal cell carcinoma, rectal cancer, thyroid cancers, parathyroid tumors, uterine tumors, rhabdomyosarcoma, Kaposi sarcoma, synovial sarcoma, osteosarcoma and Ewing's sarcoma.

Pharmaceutical Compositions, Dosage and Administration

In another aspect, the present invention provides a pharmaceutical composition comprising a compound of the present invention, or a pharmaceutically acceptable salt thereof, and a pharmaceutically acceptable carrier.

In a further embodiment, the composition comprises at least two pharmaceutically acceptable carriers, such as those described herein. The pharmaceutical composition can be formulated for particular routes of administration such as oral administration, parenteral administration (e.g. by injection, infusion, transdermal or topical administration), and rectal administration. Topical administration may also pertain to inhalation or intranasal application. The pharmaceutical compositions of the present invention can be made up in a solid form (including, without limitation, capsules, tablets, pills, granules, powders or suppositories), or in a liquid form (including, without limitation, solutions, suspensions or emulsions). Tablets may be either film coated or enteric coated according to methods known in the art. Typically, the pharmaceutical compositions are tablets or gelatin capsules comprising the active ingredient together with one or more of:

a) diluents, e.g., lactose, dextrose, sucrose, mannitol, sorbitol, cellulose and/or glycine;

b) lubricants, e.g., silica, talcum, stearic acid, its magnesium or calcium salt and/or polyethyleneglycol; for tablets also c) binders, e.g., magnesium aluminum silicate, starch paste, gelatin, tragacanth, methylcellulose, sodium carboxymethylcellulose and/or polyvinylpyrrolidone; if desired d) disintegrants, e.g., starches, agar, alginic acid or its sodium salt, or effervescent mixtures; and e) absorbents, colorants, flavors and sweeteners.

In another aspect, the compounds of the present invention are combined with other therapeutic agents, such as other anti-cancer agents, anti-allergic agents, anti-nausea agents (or anti-emetics), pain relievers, cytoprotective agents, immunomodulator and combinations thereof.

In one embodiment, the other therapeutic agent is an anti-cancer agent or chemotherapeutic agent. General chemotherapeutic agents considered for use in combination therapies include anastrozole (Arimidex®), bicalutamide (Casodex®), bleomycin sulfate (Blenoxane®), busulfan (Myleran®), busulfan injection (Busulfex®), capecitabine (Xeloda®), N4-pentoxycarbonyl-5-deoxy-5-fluorocytidine, carboplatin (Paraplatin®), carmustine (BICNU®), chlorambucil (Leukeran®), cisplatin (Platino®), cladribine (Leustatin®), cyclophosphamide (Cytoxan®) or Neosar®), cytarabine, cytosine arabinoside (Cytosar-U®), cytarabine liposome injection (DepoCyt®), dacarbazine (DTIC-Dome®), dactinomycin (Actinomycin D, Cosmegan), daunorubicin hydrochloride (Cerubidine®), daunorubicin citrate liposome injection (DaunoXome®), dexamethasone, docetaxel (Taxotere®), doxorubicin hydrochloride (Adriamycin®, Rubex®), etoposide (Vepesid®)"), fludarabine phosphate (Fludara®), 5-fluorouracil (Adrucil®, Efudex®), flutamide (Eulexin®), tezacitibine, Gemcitabine (difluorodeoxycitidine), hydroxyurea (Hydrea®), Idarubicin (Idamycin®), ifosfamide (IFEX®) irinotecan (Camptosar®), L-asparaginase (ELSPAR®), leucovorin calcium, melphalan (Alkeran®), 6-mercaptopurine (Purinethol®), methotrexate (Folex®), mitoxantrone (Novantrone®), mylotarg, paclitaxel (Taxol®), nab-paclitaxel (Abraxane®), phoenix (Yttrium90/MX-DTPA), pentostatin, polifeprosan 20 with carmustine implant (Gliadel tamoxifen citrate (Nolvadex®), teniposide (Vumon®), 6-thioguanine, thiotepa, tirapazamine (Tirazone®), topotecan hydrochloride for injection (Hycamptin®), vinblastine (Velban vincristine (Oncovin®), and vinorelbine (Navelbine®).

Anti-cancer agents of particular interest for combinations with the compounds of the invention include:

Cyclin-Dependent Kinase (CDK) inhibitors: (Chen, S. et al., Nat Cell Biol., 12 (11): 1108-14 (2010); Zeng, X. et al., Cell Cycle, 10 (4): 579-83 (2011)) Aloisine A; Alvocidib (also known as flavopiridol or HMR-1275, 2-(2-chlorophenyl)-5,7-dihydroxy-8-[(3S,4R)-3-hydroxy-1-methyl-4-piperidinyl]-4-chromenone, and described in U.S. Pat. No. 5,621,002); Crizotinib (PF-02341066, CAS 877399-52-5); 2-(2-Chlorophenyl)-5,7-dihydroxy-8-[(2R,3S)-2-(hydroxymethyl)-1-methyl-3-pyrrolidinyl]-4H-1-benzopyran-4-one, hydrochloride (P276-00, CAS 920113 Mar. 7); 1-Methyl-5-[2-[5-(trifluoromethyl)-1H-imidazol-2-yl]-4-pyridinyl]oxy]-N-[4-(trifluoromethyl)phenyl]-1H-benzimidazol-2-amine (RAF265, CAS 927880-90-8); Indisulam (E7070); Roscovitine (CYC202); 6-Acetyl-8-cyclopentyl-5-methyl-2-(5-piperazin-1-yl-pyridin-2-ylamino)-8H-pyrido[2,3-d]pyrimidin-7-one, hydrochloride (PD0332991); Dinaciclib (SCH727965); N-[5-[[(5-tert-Butyloxazol-2-yl)methyl]thio]thiazol-2-yl]piperidine-4-carboxamide (B 387032, CAS 345627-80-7); 4-[9-Chloro-7-(2,6-difluorophenyl)-5H-pyrimido[5,4-d][2]benzazepin-2-yl]amino]-benzoic acid (MLN8054, CAS 869363-13-3); 5-[3-(4,6-Difluoro-1H-benzimidazol-2-yl)-1H-indazol-5-yl]-N-ethyl-4-methyl-3-pyridinemethanamine (AG-024322, CAS 837364-57-5); 4-(2,6-Dichlorobenzoylamino)-1H-pyrazole-3-carboxylic acid N-(piperidin-4-yl) amide (AT7519, CAS 844442-38-2): 4-[2-Methyl-1-(1-methylethyl)-1H-imidazol-5-yl]-N-[4-(methylsulfonyl)phenyl]-2-pyrimidinamine (AZD5438, CAS 602306-29-6); Palbociclib (PD-0332991); and (2R,3R)-3-[2-[3-[S (R)]-S-cyclopropylsulfonimidoyl]-phenyl]amino]-5-(trifluoromethyl)-4-pyrimidinyl]oxy]-2-butanol (BAY 10000394).

Checkpoint Kinase (CHK) inhibitors: (Wu, Z. et al., Cell Death Differ., 18 (11): 1771-9 (2011)) 7-Hydroxystaurosporine (UCN-01); 6-Bromo-3-(1-methyl-1H-pyrazol-4-yl)-5-(3R)-3-piperidinyl-pyrazolo[1,5-a]pyrimidin-7-amine (SCH900776, CAS 891494-63-6); 5-(3-Fluorophenyl)-3-ureidothiophene-2-carboxylic acid N-[(S)-piperidin-3-yl]amide (AZD7762, CAS 860352 Jan. 8); 4-[((3S)-1-Azabicyclo[2.2.2]oct-3-yl)amino]-3-(1H-benzimidazol-2-yl)-6-chloroquinolin-2 (1H)-one (CHIR 124, CAS 405168-58-3); 7-Aminodactinomycin (7-AAD), Isogranulatimide, debromohymenialdisine; N-[5-Bromo-4-methyl-2-[(2S)-2-morpholinylmethoxy]-phenyl]-N'-(5-methyl-2-pyrazinyl) urea (LY2603618, CAS 911222-45-2); Sulforaphane (CAS 4478-93-7, 4-Methylsulfinylbutyl isothiocyanate); 9,10,11,12-Tetrahydro-9,12-epoxy-1H-diindolo [1,2,3-fg: 3',2', 1'-k/]pyrrolo[3,4-/][1,6]benzodiazocine-1,3 (2H)-dione (SB-218078, CAS 135897 Jun. 2); and TAT-S216A (YGRKKRRQRRR-LYRSPAMPENL), and CBP501 ((d-Bpa) sws (d-Phe-F5) (d-Cha) rrrqrr); and (αR)-α-amino-N-[5.6-dihydro-2-(1-methyl-1H-pyrazol-4-yl)-6-oxo-1H-pyrrolo [4,3,2-ef][2,3] benzodiazepin-8-yl]-Cyclohexaneacetamide (PF-0477736).

Protein Kinase B (PKB) or AKT inhibitors: (Rojanasakul, Y., Cell Cycle, 12 (2): 202-3 (2013); Chen B. et al., Cell Cycle, 12 (1): 112-21 (2013)) 8-[4-(1-Aminocyclobutyl)phenyl]-9-phenyl-1,2,4-triazolo[3,4-f][1,6]naphthyridin-3 (2H)-one (MK-2206, CAS 1032349-93-1); Perifosine (KRX0401); 4-Dodecyl-N-1,3,4-thiadiazol-2-yl-benzenesulfonamide (PHT-427, CAS 1191951-57-1); 4-[2-(4-Amino-1,2,5-oxadiazol-3-yl)-1-ethyl-7-[(3S)-3-piperidinylmethoxy]-1H-imidazo[4,5-c]pyridin-4-yl]-2-methyl-3-butyn-2-ol (GSK690693, CAS 937174-76-0); 8-(1-Hydroxyethyl)-2-methoxy-3-[(4-methoxyphenyl) methoxy]-6H-dibenzo[b,d]pyran-6-one (palomid 529, P529, or SG-00529); Tricirbine (6-Amino-4-methyl-8-(β-D-ribofuranosyl)-4H,8H-pyrrolo [4,3,2-de]pyrimido[4,5-c]pyridazine); (αS)-α-[[5-(3-Methyl-1H-indazol-5-yl)-3-pyridinyl]oxy]methyl]-benzeneethanamine (A674563, CAS 552325-73-2): 4-[(4-Chlorophenyl)methyl]-1-(7H-pyrrolo[2,3-d]pyrimidin-4-yl)-4-piperidinamine (CCT128930, CAS 885499-61-6); 4-(4-Chlorophenyl)-4-[4-(1H pyrazol-4-yl)phenyl]-piperidine (AT7867, CAS 857531-00-1); and Archexin (RX-0201, CAS 663232-27-7).

C-RAF Inhibitors: (Chang, C. et al., Cancer Cell, 19 (1): 86-100 (2011)) Sorafenib (Nexavar®); 3-(Dimethylamino)-N-[3-[(4-hydroxybenzoyl)amino]-4-methylphenyl]-benzamide (ZM336372, CAS 208260-29-1); and 3-(1-cyano-1-methylethyl)-N-[3-[(3,4-dihydro-3-methyl-4-oxo-6-quinazolinyl)amino]-4-methylphenyl]-benzamide (AZ628, CAS 1007871-84-2).

Phosphoinositide 3-kinase (PI3K) inhibitors: (Gonzalez, M. et al., Cancer Res., 71 (6): 2360-2370 (2011)) 4-[2-(1H-Indazol-4-yl)-6-[4-(methylsulfonyl) piperazin-1-yl]methyl] thieno[3,2-d]pyrimidin-4-yl]morpholine (also known as GDC 0941 and described in PCT Publication Nos. WO 09/036082 and WO 09/055730); 2-Methyl-2-[4-[3-methyl-2-oxo-8-(quinolin-3-yl)-2,3-dihydroimidazo[4,5-c]quinolin-1-yl]phenyl]propionitrile (described in PCT Publication No. WO 06/122806 and also known as dactolisib); 4-(trifluoromethyl)-5-(2,6-dimorpholinopyrimidin-4-yl) pyridin-2-amine (described in PCT Publication No. WO2007/084786 and also known as buparlisib); Tozasertib (VX680 or MK-0457, CAS 639089-54-6); (5Z)-5-[4-(4-Pyridinyl)-6-quinolinyl]methylene]-2,4-thiazolidinedione (GSK1059615, CAS 958852 Jan. 2); (1E,4S,4aR,5R,6aS,9aR)-5-(Acetyloxy)-1-[(di-2-propenylamino)methylene]-4,4a,5,6,6a,8,9,9a-octahydro-11-hydroxy-4-(methoxymethyl)-4a,6a-dimethyl-cyclopenta[5,6]naphtho[1,2-c]pyran-2,7,10 (1H)-trione (PX866, CAS 502632-66-8): 8-Phenyl-2-(morpholin-4-yl)-chromen-4-one (LY294002, CAS 154447-36-6); 2-Amino-8-ethyl-4-methyl-6-(1H-pyrazol-5-yl) pyrido[2,3-d]pyrimidin-7 (8H)-one (SAR 245409 or XL 765); 1,3-Dihydro-8-(6-methoxy-3-pyridinyl)-3-methyl-1-[4-(1-piperazinyl)-3-(trifluoromethyl)phenyl]-2H-imidazo [4,5-c]quinolin-2-one, (2Z)-2-butenedioate (1:1) (BGT 226): 5-Fluoro-3-phenyl-2-[(1S)-1-(9H-purin-6-ylamino) ethyl]-4 (3H)-quinazolinone (CAL101): 2-Amino-N-[3-[N-[3-[(2-chloro-5-methoxyphenyl)amino]quinoxalin-2-yl]sulfamoyl]phenyl]-2-methylpropanamide (SAR 245408 or XL 147); and(S)-Pyrrolidine-1,2-dicarboxylic acid 2-amide 1-({4-methyl-5-[2-(2,2,2-trifluoro-1,1-dimethyl-ethyl)-pyridin-4-yl]-thiazol-2-yl}-amide) (BYL719).

BCL-2 inhibitors: (Béguelin, W. et al., Cancer Cell, 23 (5): 677-92 (2013)) 4-[4-[[2-(4-Chlorophenyl)-5,5-dimethyl-1-cyclohexen-1-yl]methyl]-1-piperazinyl]-N-[4-[(1R)-3-(4-morpholinyl)-1-[(phenylthio) methyl]propyl] amino]-3-[(trifluoromethyl) sulfonyl]phenyl]sulfonyl] benzamide (also known as ABT-263 and described in PCT Publication No. WO 09/155386); Tetrocarcin A; Antimycin; Gossypol ((-) BL-193); Obatoclax; Ethyl-2-amino-6-cyclopentyl-4-(1-cyano-2-ethoxy-2-oxoethyl)-4Hchromene-3-carboxylate (HA14-1); Oblimersen (G3139, Genasense®); Bak BH3 peptide; (-)-Gossypol acetic acid (AT-101): 4-[4-[(4'-Chloro[1,1'-biphenyl]-2-yl)methyl]-1-piperazinyl]-N-[4-[(1R)-3-(dimethylamino)-1-[(phenylthio)methyl]propyl]

amino]-3-nitrophenyl]sulfonyl]-benzamide (ABT-737, CAS 852808 Apr. 9); and Navitoclax (ABT-263, CAS 923564-51-6).

Mitogen-activated protein kinase (MEK) inhibitors: (Chang, C. J. et al., Cancer Cell, 19 (1): 86-100 (2011)) XL-518 (also known as GDC-0973, Cas No. 1029872-29-4, available from ACC Corp.); Selumetinib (5-[(4-bromo-2-chlorophenyl)amino]-4-fluoro-N-(2-hydroxyethoxy)-1-methyl-1H-benzimidazole-6-carboxamide, also known as AZD6244 or ARRY 142886, described in PCT Publication No. WO2003077914); Benimetinib (6-(4-bromo-2-fluorophenylamino)-7-fluoro-3-methyl-3H-benzoimidazole-5-carboxylic acid (2-hydroxyethyoxy)-amide, also known as MEK162, CAS 1073666-70-2, described in PCT Publication No. WO2003077914); 2-[(2-Chloro-4-iodophenyl) amino]-N-(cyclopropylmethoxy)-3,4-difluoro-benzamide (also known as CI-1040 or PD184352 and described in PCT Publication No. WO2000035436); N-[(2R)-2,3-Dihydroxypropoxy]-3,4-difluoro-2-[(2-fluoro-4-iodophenyl)amino]-benzamide (also known as PD0325901 and described in PCT Publication No. WO2002006213); 2,3-Bis[amino[(2-aminophenyl)thio]methylene]-butanedinitrile (also known as U0126 and described in U.S. Pat. No. 2,779,780); N-[3,4-Difluoro-2-[(2-fluoro-4-iodophenyl)amino]-6-methoxyphenyl]-1-[(2R)-2,3-dihydroxypropyl]-cyclopropanesulfonamide (also known as RDEA119 or BAY869766 and described in PCT Publication No. WO2007014011); (3S,4R.5Z,8S,9S, 11E)-14-(Ethylamino)-8,9, 16-trihydroxy-3,4-dimethyl-3,4,9, 19-tetrahydro-1H-2-benzoxacyclotetradecine-1,7 (8H)-dione](also known as E6201 and described in PCT Publication No. WO2003076424); 2'-Amino-3'-methoxyflavone (also known as PD98059 available from Biaffin GmbH & Co., KG, Germany); Vemurafenib (PLX-4032, CAS 918504-65-1); (R)-3-(2,3-Dihydroxypropyl)-6-fluoro-5-(2-fluoro-4-iodophenylamino)-8-methylpyrido[2,3-d]pyrimidine-4,7 (3H,8H)-dione (TAK-733, CAS 1035555-63-5); Pimasertib (AS-703026, CAS 1204531-26-9); Trametinib dimethyl sulfoxide (GSK-1120212, CAS 1204531-25-80); 2-(2-Fluoro-4-iodophenylamino)-N-(2-hydroxyethoxy)-1,5-dimethyl-6-oxo-1,6-dihydropyridine-3-carboxamide (AZD 8330); and 3,4-Difluoro-2-[(2-fluoro-4-iodophenyl)amino]-N-(2-hydroxyethoxy)-5-[(3-oxo-[1,2] oxazinan-2-yl)methyl]benzamide (CH 4987655 or Ro 4987655).

Aromatase inhibitors: (Pathiraja, T. et al., Sci. Transl. Med., 6 (229): 229 ra41 (2014)) Exemestane (Aromasin®); Letrozole (Femara®); and Anastrozole (Arimidex®).

Topoisomerase II inhibitors: (Bai, J. et al., Cell Prolif., 47 (3): 211-8 (2014)) Etoposide (VP-16 and Etoposide phosphate, Toposar®, VePesid® and Etopophos®); Teniposide (VM-26, Vumon®); and Tafluposide.

SRC inhibitors: (Hebbard, L., Oncogene, 30 (3): 301-12 (2011)) Dasatinib (Sprycel®); Saracatinib (AZD0530, CAS 379231 Apr. 6); Bosutinib (SKI-606, CAS 380843-75-4); 5-[4-[2-(4-Morpholinyl) ethoxy]phenyl]-N-(phenylmethyl)-2-pyridineacetamide (KX2-391, CAS 897016-82-9); and 4-(2-Chloro-5-methoxyanilino)-6-methoxy-7-(1-methylpiperidin-4-ylmethoxy) quinazoline (AZM475271, CAS 476159-98-5).

Histone deacetylase (HDAC) inhibitors: (Yamaguchi, J. et al., Cancer Sci., 101 (2): 355-62 (2010)) Voninostat (Zolinza®); Romidepsin (Istodax®); Treichostatin A (TSA); Oxamflatin; Vorinostat (Zolinza®, Suberoylanilide hydroxamic acid); Pyroxamide (syberoyl-3-aminopyridine-amide hydroxamic acid); Trapoxin A (RF-1023A); Trapoxin B (RF-10238); Cyclo[(αS,2S)-α-amino-n-oxo-2-oxiraneoctanoyl-O-methyl-D-tyrosyl-L-isoleucyl-L-prolyl](Cyl-1); Cyclo[(αS,2S)-α-amino-n-oxo-2-oxiraneoctanoyl-O-methyl-D-tyrosyl-L-isoleucyl-(2S)-2-piperidinecarbonyl] (Cyl-2); Cyclic[L-alanyl-D-alanyl-(2S)-n-oxo-L-α-aminooxiraneoctanoyl-D-prolyl](HC-toxin); Cyclo[(αS,2S)-α-amino-n-oxo-2-oxiraneoctanoyl-D-phenylalanyl-L-leucyl-(2S)-2-piperidinecarbonyl] (WF-3161); Chlamydocin ((S)-Cyclic (2-methylalanyi-L-phenylalanyl-D-prolyl-n-oxo-L-α-aminooxiraneoctanoyl); Apicidin (Cyclo(8-oxo-L-2-aminodecanoyl-1-methoxy-L-tryptophyl-L-isoleucyl-D-2-piperidinecarbonyl); Romidepsin (Istodax®, FR-901228); 4-Phenylbutyrate; Spiruchostatin A; Mylproin (Valproic acid); Entinostat (−275, N-(2-Aminophenyl)-4-[N-(pyridine-3-yl-methoxycarbonyl)-amino-methyl]-benzamide); and Depudecin (4,5:8,9-dianhydro-1,2,6,7, 11-pentadeoxy-D-threo-D-ido-Undeca-1,6-dienitol).

Anti-tumor antibiotics: (Bai, J. et al., Cell Prolif., 47 (3): 211-8 (2014)) Doxorubicin (Adriamycin® and Rubex®); Bleomycin (lenoxane®); Daunorubicin (dauorubicin hydrochloride, daunomycin, and rubidomycin hydrochloride, Cerubidine®); Daunorubicin liposomal (daunorubicin citrate liposome, DaunoXome®); Mitoxantrone (DHAD, Novantrone®); Epirubicin (Ellence™); Idarubicin (Idamycin®), Idamycin PFS®); Mitomycin C (Mutamycin®); Geldanamycin; Herbimycin; Ravidomycin; and Desacetyl-ravidomycin.

Demethylating agents: (Musch, T. et al., PLOS One, (5): e10726 (2010)) 5-Azacitidine (Vidaza®); and Decitabine (Dacogen®).

Anti-estrogens: (Bhan, A. et al., J Mol Biol., S0022-2836 (14) 00373-8 (2014)) Tamoxifen (Novaldex®); Toremifene (Fareston®); and Fulvestrant (Faslodex®).

Immunomodulators of particular interest for combinations with the compounds of the invention include one or more of: an activator of a costimulatory molecule or an inhibitor of an immune checkpoint molecule (e.g., one or more inhibitors of PD-1, PD-L1, LAG-3, TIM-3 or CTLA4) or any combination thereof.

In certain embodiments, the immunomodulator is an activator of a costimulatory molecule. In one embodiment, the agonist of the costimulatory molecule is chosen from an agonist (e.g., an agonistic antibody or antigen-binding fragment thereof, or a soluble fusion) of OX40, CD2, CD27, CDS, ICAM-1, LFA-1 (CD11a/CD18), ICOS (CD278), 4-1BB (CD137), GITR, CD30, CD40, BAFFR, HVEM, CD7, LIGHT, NKG2C, SLAMF7, NKp80, CD160, B7-H3 or CD83 ligand.

In certain embodiments, the immunomodulator is an inhibitor of an immune checkpoint molecule. In one embodiment, the immunomodulator is an inhibitor of PD-1, PD-L1, PD-L2, CTLA4, TIM3, LAG3, VISTA, BTLA, TIGIT, LAIR1, CD160, 2B4 and/or TGFR beta. In one embodiment, the inhibitor of an immune checkpoint molecule inhibits PD-1, PD-L1, LAG-3, TIM-3 or CTLA4, or any combination thereof. The term "inhibition" or "inhibitor" includes a reduction in a certain parameter, e.g., an activity, of a given molecule, e.g., an immune checkpoint inhibitor. For example, inhibition of an activity, e.g., a PD-1 or PD-L1 activity, of at least 5%, 10%, 20%, 30%, 40% or more is included by this term. Thus, inhibition need not be 100%.

In another aspect, the present invention provides pharmaceutical compositions comprising at least one compound of the present invention (e.g., a compound of Formula (I) or a sub-formulae theref) or a pharmaceutically acceptable salt thereof, together with a pharmaceutically acceptable carrier suitable for administration to a human or animal subject, either alone or together with other anti-cancer agents.

In combination therapies, compositions will either be formulated together as a combination therapeutic, or as separate compositions. The compound of the invention and the other therapeutic agent may be manufactured and/or formulated by the same or different manufacturers. The structure of therapeutic agents identified by code numbers, generic or trade names may be taken from the actual edition of the standard compendium "The Merck Index" or from databases, e.g. Patents International (e.g. IMS World Publications). The other therapeutic agents, which can be used in combination with a compound of the present invention, can be prepared and administered as described in the art, such as in the documents cited above.

Optionally, the pharmaceutical composition may comprise a pharmaceutically acceptable carrier, as described above. The pharmaceutical composition or combination of the present invention may, for example, be in unit dosage of about 0.5 mg to 1000 mg of active ingredient(s) for a subject of about 50-70 kg.

In another aspect, the present invention provides methods of treating human or animal subjects suffering from a cellular proliferative disease, such as cancer, comprising administering to the subject a therapeutically effective amount of a compound of the present invention or a pharmaceutically acceptable salt thereof, either alone or in combination with other anti-cancer agents. In combination therapy, the compound of the present invention and other anti-cancer agent(s) may be administered either simultaneously, concurrently or sequentially with no specific time limits, wherein such administration provides therapeutically effective levels of the two compounds in the body of the patient. Moreover, the compound of the invention and the other therapeutic may be brought together into a combination therapy: (i) prior to release of the combination product to physicians (e.g. in the case of a kit comprising the compound of the invention and the other therapeutic agent); (ii) by the physician themselves (or under the guidance of the physician) shortly before administration; (iii) in the patient themselves, e.g. during sequential administration of the compound of the invention and the other therapeutic agent.

In one embodiment, the compound of the present invention and the other anti-cancer agent(s) is generally administered sequentially in any order by infusion or orally. The dosing regimen may vary depending upon the stage of the disease, physical fitness of the patient, safety profiles of the individual drugs, and tolerance of the individual drugs, as well as other criteria well-known to the attending physician and medical practitioner(s) administering the combination. The compound of the present invention and other anti-cancer agent(s) may be administered within minutes of each other, hours, days, or even weeks apart depending upon the particular cycle being used for treatment. In addition, the cycle could include administration of one drug more often than the other during the treatment cycle and at different doses per administration of the drug.

In yet another aspect, compounds of the present invention may be combined with other anti-cancer agents, anti-allergic agents, anti-nausea agents (or anti-emetics), pain relievers, cytoprotective agents, and combinations thereof.

In some instances, patients may experience allergic reactions to the compounds of the present invention and/or other anti-cancer agent(s) during or after administration. Therefore, anti-allergic agents may be administered to minimize the risk of an allergic reaction. Suitable anti-allergic agents include corticosteroids, such as dexamethasone (e.g., DECADRON®), beclomethasone (e.g., BECLOVENT®), hydrocortisone (also known as cortisone, hydrocortisone sodium succinate, hydrocortisone sodium phosphate; e.g., ALA-CORT®, hydrocortisone phosphate. Solu-CORTEF®, HYDROCORT Acetate® and LANACORT®), prednisolone (e.g., DELTA-Cortel®, ORAPRED®, PEDIAPRED® and PRELONE®), prednisone (e.g., DELTASONE®, LIQUID RED®, METICORTEN® and ORASONE®), methylprednisolone (also known as 6-methylprednisolone, methylprednisolone acetate, methylprednisolone sodium succinate; e.g., DURALONE®, MEDRALONE®, MEDROL®. M-PREDNISOL® and SOLU-MEDROL®); antihistamines, such as diphenhydramine (e.g., BENADRYL®), hydroxyzine, and cyproheptadine; and bronchodilators, such as the beta-adrenergic receptor agonists, albuterol (e.g., PROVENTIL®), and terbutaline (BRETHINE®).

In other instances, patients may experience nausea during and after administration of the compound of the present invention and/or other anti-cancer agent(s). Therefore, anti-emetics may be administered in preventing nausea (upper stomach) and vomiting. Suitable anti-emetics include aprepitant (EMEND®), ondansetron (ZOFRAN®), granisetron HCl (KYTRIL®), lorazepam (ATIVAN®, dexamethasone (DECADRON®), prochlorperazine (COMPAZINE®), casopitant (REZONIC® and Zunrisa®), and combinations thereof.

In yet other instances, medication to alleviate the pain experienced during the treatment period is prescribed to make the patient more comfortable. Common over-the-counter analgesics, such TYLENOL®, are often used. Opioid analgesic drugs such as hydrocodone/paracetamol or hydrocodone/acetaminophen (e.g., VICODIN@), morphine (e.g., ASTRAMORPH® or AVINZA®), oxycodone (e.g., OXYCONTIN® or PERCOCET®), oxymorphone hydrochloride (OPANA®), and fentanyl (e.g., DURAGESIC®) are also useful for moderate or severe pain.

Furthermore, cytoprotective agents (such as neuroprotectants, free-radical scavengers, cardioprotectors, anthracycline extravasation neutralizers, nutrients and the like) may be used as an adjunct therapy to protect normal cells from treatment toxicity and to limit organ toxicities. Suitable cytoprotective agents include amifostine (ETHYOL®), glutamine, dimesna (TAVOCEPT®), mesna (MESNEX®), dexrazoxane (ZINECARD® or TOTECT®), xaliproden (XAPRILA®), and leucovorin (also known as calcium leucovorin, citrovorum factor and folinic acid).

In yet another aspect, a compound of the present invention may be used in combination with known therapeutic processes, for example, with the administration of hormones or in radiation therapy. In certain instances, a compound of the present invention may be used as a radiosensitizer, especially for the treatment of tumors which exhibit poor sensitivity to radiotherapy.

In yet another aspect, the present invention provides kits comprising one or more compounds of the present invention and another therapeutic agent as described above. Representative kits include (a) compound of Formula (I) or sub-formulae thereof or a pharmaceutically acceptable salt thereof; and (b) at least one other therapeutic agent e.g., as indicated above; whereby such kit may further comprise a package insert or other labeling including directions for administration. The kits of the invention may be used for administering different dosage forms, for example, oral and parenteral; for administering two or more separate pharmaceutical compositions at different dosage intervals; or for titrating the separate compositions against one another; wherein at least one pharmaceutical composition comprises a compound a Formula (I) or sub-formulae thereof.

Processes for Making Compounds of the Invention

The compounds of the invention can be prepared using the methods described below, or by variations thereon as appreciated by one skilled in the art of organic synthesis. Compounds of Formula (I) that possess a chiral center can be made substantially optically pure by using substantially optically pure starting material or by separation chromatography, recrystallization or other separation techniques well-known in the art.

Scheme 1

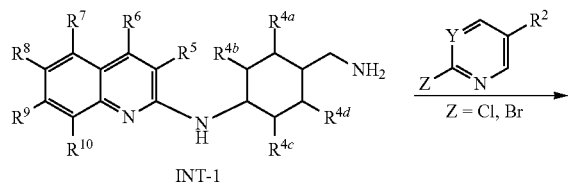

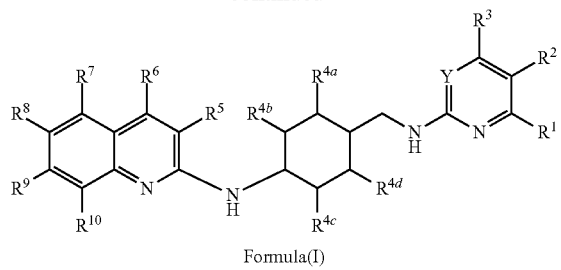

Formula (I)

As depicted in Scheme 1, compounds of Formula (I) may be prepared from displacement reactions of the corresponding amine (INT-1) with appropriately substituted 2-halo-substituted pyrimidines or pyridines.

Scheme 2

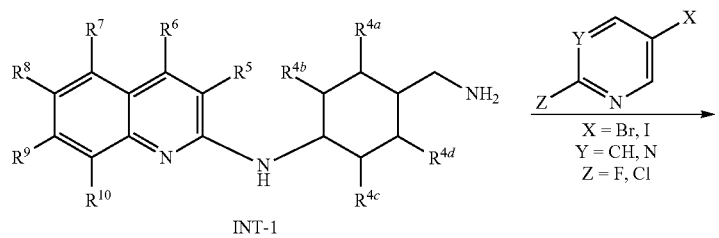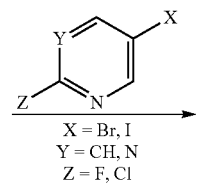

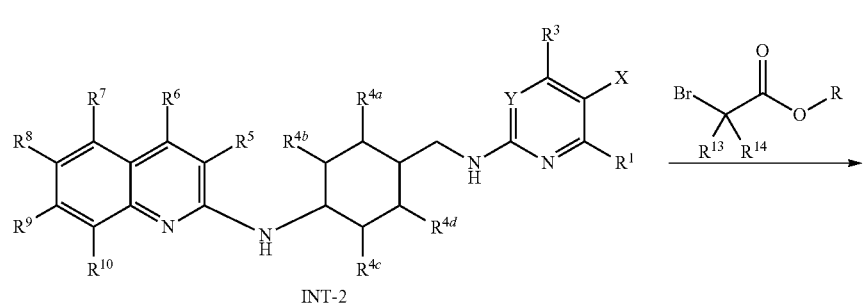

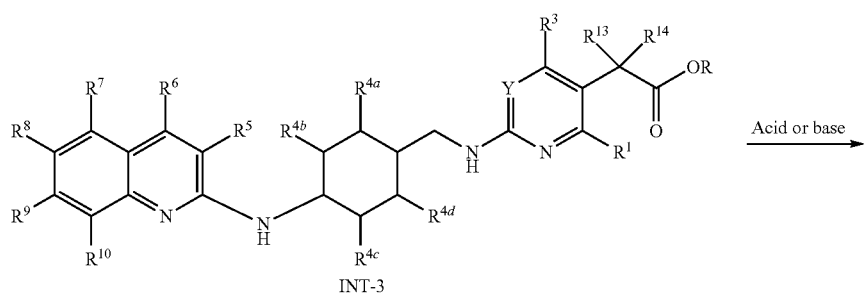

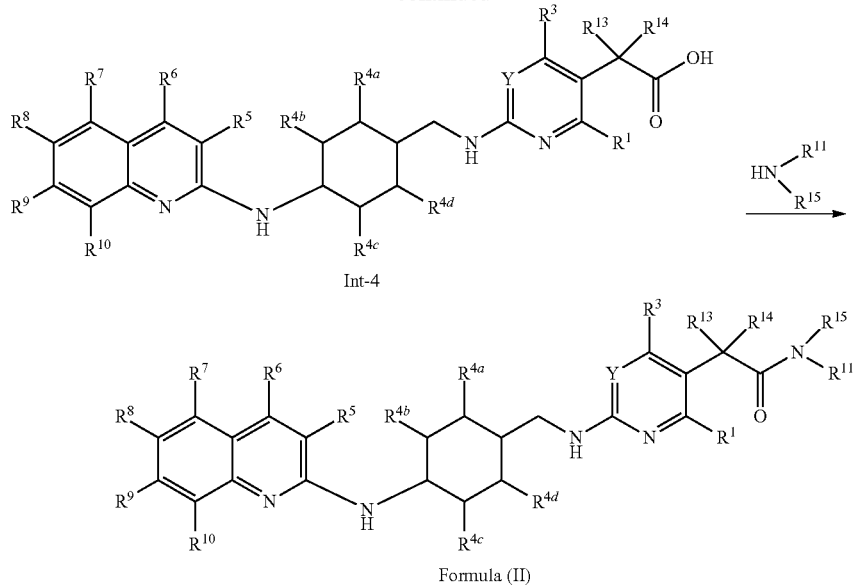

As depicted in Scheme 2, reaction of the amine INT-1 with the appropriate pyridine or pyrimidine halides gives the corresponding halo intermediates INT-2. Subsequent coupling of halo intermediate INT-2 with the appropriate bromides gives the ester intermediate INT-3, which can be hydrolyzed under acidic or basic conditions to the acid intermediate INT-4. Compounds of Formula (I) may be prepared by coupling the acid intermediate INT-4 with appropriately substituted amines.

Scheme 3

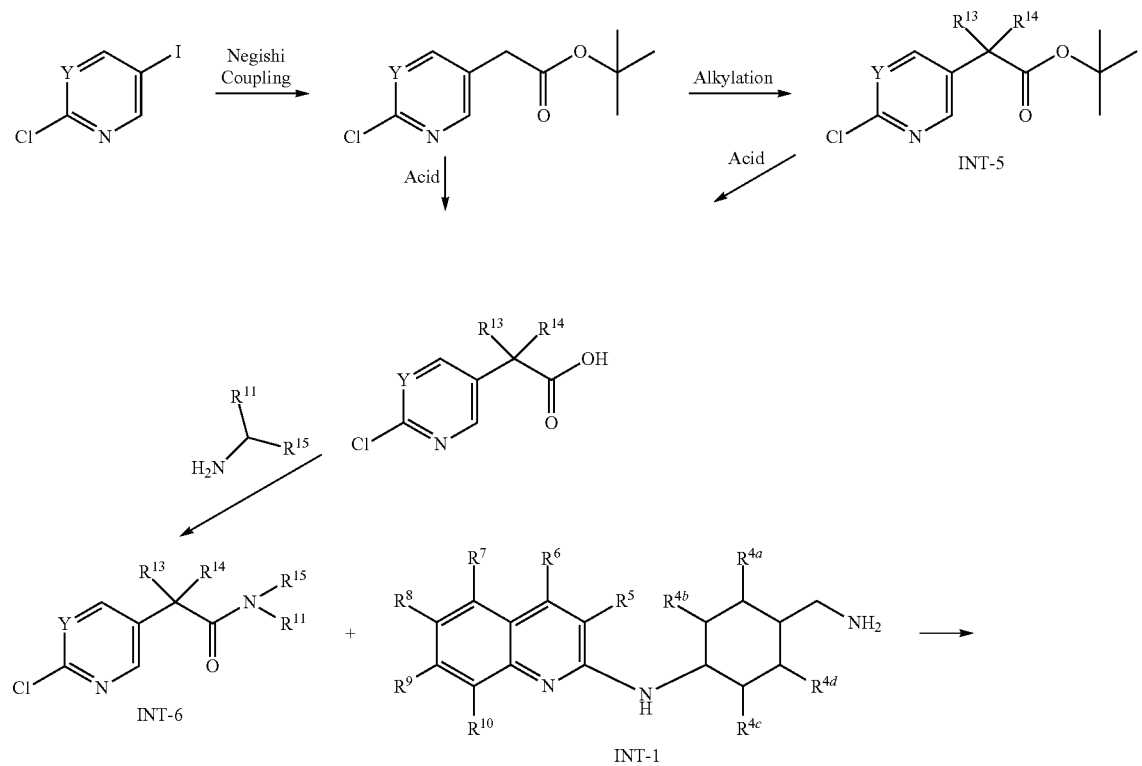

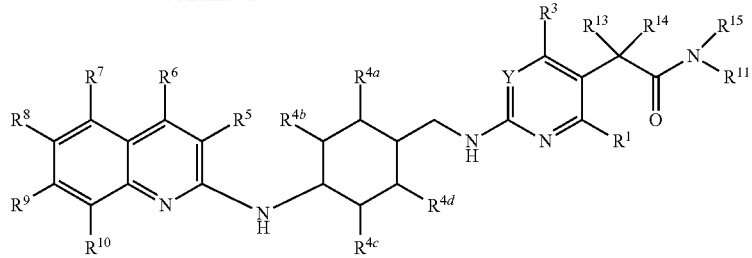

Formula (II)

As depicted in Scheme 3, Negishi coupling of 2-chloro-5-iodo pyrimidine/pyridines with the corresponding bromoacetate, and subsequent alkylation gives the intermediate INT-5. Hydrolysis of INT-5 and coupling with the corresponding amine gives the corresponding chloro-pyrimidine or pyridine amide intermediate INT-6. Compounds of Formula (II) may be prepared from displacement reactions of the corresponding amine (INT-1) with appropriately substituted chloro-pyrimidine or pyridine amide intermediate INT-6.

EXAMPLES

Temperatures are given in degrees Celsius. The structure of final products, intermediates and starting materials is confirmed by standard analytical methods, e.g., microanalysis and spectroscopic characteristics, e.g., MS, IR, NMR. Abbreviations used are those conventional in the art.

All starting materials, building blocks, reagents, acids, bases, dehydrating agents, solvents, and catalysts utilized to synthesis the compounds of the present invention are either commercially available or can be produced by organic synthesis methods known to one of ordinary skill in the art (Houben-Weyl 4th Ed. 1952, Methods of Organic Synthesis, Thieme, Volume 21). Unless otherwise specified, starting materials are generally available from commercial sources.

The Examples herein merely illuminate the invention and does not limit the scope of the invention otherwise claimed. Further, the compounds of the present invention can be produced by organic synthesis methods known to one of ordinary skill in the art as shown in the following examples. Where desired, conventional protecting groups are used to protect reactive functional groups in accordance with standard practice, for example, see T.W. Greene and P.G.M. Wuts in "Protecting Groups in Organic Synthesis", John Wiley and Sons, 1991.

Abbreviations

Abbreviations as used herein, are defined as follows: "1×" for once, "2×" for twice, "3×" for thrice, "° C." for degrees Celsius, "aq" for aqueous, "FCC" for flash column chromatography, "eq" for equivalent or equivalents, "g" for gram or grams, "mg" for milligram or milligrams, "L" for liter or liters, "mL" for milliliter or milliliters, "µL" for microliter or microliters, "N" for normal, "M" for molar, "nM" for nanomolar, "mol" for mole or moles, "mmol" for millimole or millimoles, "min" for minute or minutes, "h" or "hrs" for hour or hours, "RT" for room temperature, "ON" for overnight, "atm" for atmosphere, "psi" for pounds per square inch, "conc." for concentrate, "sat" or "sat'd" for saturated, "MW" for molecular weight, "mw" or "uwave" for microwave, "mp" for melting point, "Wt" for weight, "MS" or "Mass Spec" for mass spectrometry, "ESI" for electrospray ionization mass spectroscopy, "HR" for high resolution, "HRMS" for high resolution mass spectrometry, "LCMS" or "LC-MS" for liquid chromatography mass spectrometry, "HPLC" for high pressure liquid chromatography, "RP HPLC" for reverse phase HPLC, "TLC" or "tlc" for thin layer chromatography, "NMR" for nuclear magnetic resonance spectroscopy, "nOe" for nuclear Overhauser effect spectroscopy, "'H" for proton, "0" for delta, "s" for singlet, "d" for doublet, "t" for triplet, "q" for quartet, "m" for multiplet, "br" for broad, "Hz" for hertz, "ee" for "enantiomeric excess" and "a", "B", "R", "r", "S", "s", "E", and "Z" are stereochemical designations familiar to one skilled in the art.

The following abbreviations used herein below have the corresponding meanings:

| | |
|---|---|
| Boc | tert-butoxy carbonyl |
| DCM/CH$_2$Cl$_2$ | dichloromethane |
| DIEA/DIPEA | N-ethyl-N-isopropylpropan-2-amine |
| DMSO | dimethylsulfoxide |
| EA/EtOAc | ethyl acetate |
| EDCI | 1-ethyl-3-(3-dimethylaminopropyl)carbodiimide |
| EtOH | ethanol |
| i-PrOH | isopropyl |
| MeOH | methanol |
| MeNH$_2$ | methanamine |
| MnO$_2$ | manganese dioxide |
| Pd$_2$dba$_3$ | Tris(dibenzylideneacetone)dipalladium |
| TFA | trifluoroacetic acid |
| TMSCl | chlorotrimethylsilane |
| X-Phos | 2-(dicyclohexylphosphino)-2',4',6'-triisopropylbiphenyl |

Nuclear magnetic resonance (NMR) analysis was performed using a Bruker 400 MHz NMR. The spectral reference was either TMS or the known chemical shift of the solvent.

Intermediates

Intermediate 1._tert-butyl (((1R,4R)-4-((8-chloro-7-methylquinolin-2-yl)amino)cyclohexyl)methyl) carbamate

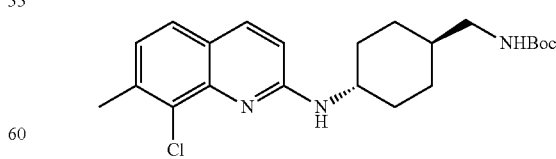

To a solution of 2,8-dichloro-7-methylquinoline (CAS 1690692-63-7, 1.95 g, 9.22 mmol) and tert-butyl (((1R,4R)-4-aminocyclohexyl)methyl) carbamate (CAS 192323 Jul. 2, 2.07 g, 9.68 mmol) was added K$_2$CO$_3$ (3.82 g, 27.7 mmol) in NMP (20 mL). The mixture was stirred at 150° C. for 5 h and the cooled to room rt. Water (30 mL) was added to the mixture and the aqueous phase was extracted with EtOAc (3×30 mL). The combined organic layers were washed with brine, dried (Na₂SO₄), filtered and concentrated under reduced pressure. The residue was purified by flash column chromatography on silica gel eluting with petroleum ether/EtOAc 15% to 25% to provide tert-butyl (((1R,4R)-4-((8-chloro-7-methylquinolin-2-yl)amino)cyclohexyl)methyl) carbamate. 1H NMR (400 MHz, DMSO-d6) δ ppm 0.97-1.09 (m, 2H), 1.14-1.22 (m, 2H), 1.39 (s, 9H), 1.45 (br. s., 1H), 1.75 (d, J=11.80Hz, 2H), 2.13 (d, J=11.04Hz. 2H). 2.46 (s, 3H), 2.82 (t. J=6.02Hz, 2H), 3.83-3.96 (m, 1H), 6.72 (d. J=8.78 Hz, 1H), 6.87 (br. s., 1H), 7.08 (d. J=8.03Hz, 2H), 7.46 (d, J=8.28Hz, 1H), 7.81 (d, J=8.78 Hz, 1H). LCMS: 404.2

Intermediate 2. (1R,4R)—N1-(8-chloro-7-methylquinolin-2-yl)cyclohexane-1,4-diamine

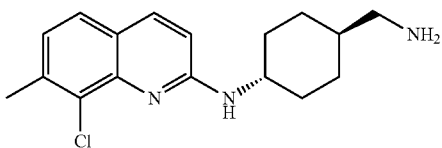 [SMILES: Cc1ccc2ccc(N[C@H]3CC[C@H](CN)CC3)nc2c1Cl]

To a solution of tert-butyl (((1R,4R)-4-((8-chloro-7-methylquinolin-2-yl)amino)cyclohexyl)methyl) carbamate (1.25 g, 3.22 mmol) in DCM (15 mL) was added TFA (5 mL). The mixture was stirred at 30° C. for 2 h. The solvent was evaporated under reduced pressure and the residue was dissolved in DCM/i-PrOH (3:1, 50 mL), the pH was adjusted to 9 with aq. NaHCO₃. The aqueous phase was extracted with DCM/i-PrOH (3:1, 3×20 mL). The combined organic layers were washed with brine, dried (Na₂SO₄), filtered and concentrated under reduced pressure. The residue was purified by flash column chromatography on silica gel eluting with petroleum ether/EtOAc 35% to 55% to provide (1R,4R)—N1-(8-chloro-7-methylquinolin-2-yl)cyclohexane-1,4-diamine.

Intermediate 3. 8-chloro-N-((1R,4R)-4-(((5-iodopyrimidin-2-yl)amino)methyl)cyclohexyl)-7-methylquinolin-2-amine

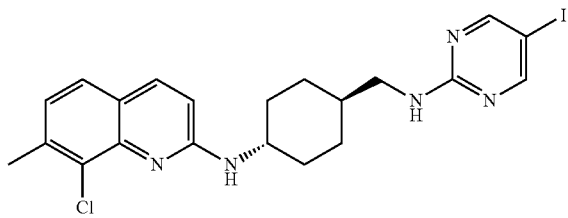 [SMILES: Cc1ccc2ccc(N[C@H]3CC[C@H](CNc4ncc(I)cn4)CC3)nc2c1Cl]

To a solution of (1R,4R)—N1-(8-chloro-7-methylquinolin-2-yl)cyclohexane-1,4-diamine (805 mg, 2.78 mmol) in EtOH (10 mL) were added 2-chloro-5-iodopyrimidine (CAS: 32779-38-7, 702 mg, 2.92 mmol) and DIPEA (1.08 g, 8.34 mmol). The reaction mixture was stirred at 80° C. overnight. The solvent was evaporated and the residue was dissolved in DCM (50 mL) and water (30 mL). The aqueous phase was extracted with DCM (3×30 mL). The combined organic layers were washed with brine, dried (Na₂SO₄), filtered and concentrated under reduced pressure. The residue was purified by flash column chromatography on silica gel eluting with petroleum ether/EtOAc 15% to 25% to provide 8-chloro-N-((1R,4R)-4-(((5-iodopyrimidin-2-yl)amino)methyl)cyclohexyl)-7-methylquinolin-2-amine.

Intermediate 4. tert-butyl 2-(2-((((1R,4R)-4-((8-chloro-7-methylquinolin-2-yl)amino)cyclohexyl)methyl)amino)pyrimidin-5-yl)acetate

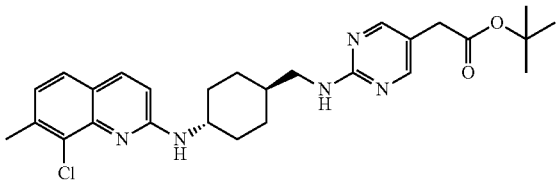 [SMILES: Cc1ccc2ccc(N[C@H]3CC[C@H](CNc4ncc(CC(=O)OC(C)(C)C)cn4)CC3)nc2c1Cl]

TMSCI (0.03 mL, 0.29 mmol) was added to a suspension of zinc powder (11.3 g, 173 mmol) in dry THF (270 mL). After stirring at rt for 20 min, a solution of tert-butyl 2-bromoacetate (CAS: 5292-43-3, 16.8 mL, 115 mmol) was added. The mixture was stirred at 60° C. for 1 h and then cooled to rt. The suspension was added to a mixture of 8-chloro-N-((1R,4R)-4-(((5-iodopyrimidin-2-yl)amino)methyl)cyclohexyl)-7-methylquinolin-2-amine (2.93 g, 5.77 mmol), Pd2 (dba): (260 mg, 0.28 mmol) and X-Phos (266 mg, 0.56 mmol) at rt and then heated at 60° C. under N₂ overnight. The mixture was quenched with NH₄Cl (100 mL). The aqueous phase was extracted with EtOAc (3×100 mL). The combined organic layers were washed with brine, dried (Na₂SO₄), filtered and concentrated under reduced pressure. The residue was purified by flash column chromatography on silica gel eluting with petroleum ether/EtOAc 30% to 80% to provide tert-butyl 2-(2-((((1R,4R)-4-((8-chloro-7-methylquinolin-2-yl)amino)cyclohexyl)methyl)amino)pyrimidin-5-yl)acetate.

Intermediate 5. 8-chloro-N-((1R,4R)-4-(((5-iodopyrimidin-2-yl)amino)methyl)cyclohexyl)-7-methylquinolin-2-amine

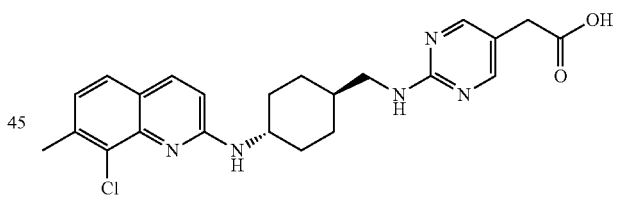

A solution of tert-butyl 2-(2-((((1R,4R)-4-((8-chloro-7-methylquinolin-2-yl)amino)cyclohexyl)methyl)amino)pyrimidin-5-yl)acetate (4.20 g, 8.46 mmol) in DCM (20 mL) and TFA (20 mL) was left to stand at rt for 1 h. The solvent was evaporated under reduced pressure and the residue was dissolved in DCM/iPrOH (3:1, 50 mL) and adjusted to a pH between 5 and 6. The aqueous phase was extracted with DCM/iPrOH (3:1, 3×50 mL). The combined organic layers were washed with brine, dried (MgSO₄), filtered and concentrated under reduced pressure. to provide 8-chloro-N-((1R,4R)-4-(((5-iodopyrimidin-2-yl)amino)methyl)cyclohexyl)-7-methylquinolin-2-amine. $^1$H NMR (400 MHZ, DMSO-d6) δ ppm 1.00-1.25 (m, 4H), 1.50-1.65 (m, 1H), 1.75-1.90 (m, 2H), 2.10-2.20 (m. 2H), 2.45 (s, 3H), 3.10-3.20 (m, 2H), 3.25-3.35 (m, 2H), 3.9 (m, 1H), 6.7 (d, 1H), 7.05 (d, 2H), 7.15 (m, 1H), 7.45 (d. 1H). 7.80 (d. 1H), 8.15 (s, 2H), 12.25.12.50 (br. S, 1H). MS: [M+H]⁺=440, 442

EXAMPLES

Example 1. 2-(2-(((((1R,4R)-4-((8-chloro-7-methylquinolin-2-yl)amino)cyclohexyl)methyl)amino)pyrimidin-5-yl)-N-(oxetan-3-yl)acetamide

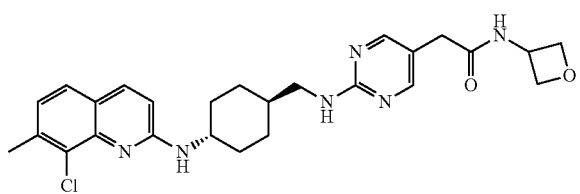 [SMILES: Cc1ccc2ccc(N[C@H]3CC[C@H](CNc4ncc(CC(=O)NC5COC5)cn4)CC3)nc2c1Cl]

A mixture of 8-chloro-N-((1R,4R)-4-(((5-iodopyrimidin-2-yl)amino)methyl)cyclohexyl)-7-methylquinolin-2-amine (Intermediate 5) (2.50 g, 5.68 mmol), oxetan-3-amine (CAS: 21635-88-1, 513 mg, 8.52 mmol), DMAP (693 mg, 5.68 mmol) and EDCI (2.17 g, 11.4 mmol) in DCM (40 mL) was stirred at 25° C. for 16 h. The mixture was adjusted to pH 6. The aqueous phase was extracted with DCM (3 times 30 mL). The combined organic layers were washed with $NaHCO_3$, washed with brine, dried ($Na_2SO_4$), filtered and concentrated under reduced pressure. The residue was purified by column chromatography on eluting first with petroleum ether/EtOAc 40% to 100% and then with solvent A (2 N $NH_3$ in MeOH/MeOH/DCM 1:10:100) in DCM 20% to 40% to provide 2-(2-(((((1R,4R)-4-((8-chloro-7-methylquinolin-2-yl)amino)cyclohexyl)methyl)amino)pyrimidin-5-yl)-N-(oxetan-3-yl)acetamide. 1H NMR (500 MHZ, DMSO-d6) δ ppm 1.05-1.25 (m, 4H), 1.55-1.65 (m, 1H), 1.80-1.85 (m, 2H), 2.10-2.15 (m, 2H), 2.45 (s, 3H), 3.15 (t, 2H), 3.25 (s, 2H), 3.85-3.95 (br s, 1H), 4.40 (t, 2H), 4.70 (t, 2H), 4.75.4.80 (m. 1H), 6.75 (d, 1H), 7.05 (d, 2H), 7.15 (t, 1H), 7.45 (d. 1H), 7.80 (d, 1H), 8.12 (s, 2H), 8.72 (0, 1H). MS: [M+H]+=495, 497.

The following compounds may be prepared following procedures analogous to Example 1, or from methods described in Schemes 1-3, from corresponding intermediates.

| Example | | MS |
|---|---|---|
| 2 | (structure) | [M + H]+ = 509, 511 |
| 3 | (structure) | [M + H]+ = 531, 533 |
| 4 | (structure) | [M + H]+ = 525 |
| 5 | (structure) | [M + H]+ = 520, 522 |

-continued
| Example | | MS |
|---|---|---|
| 6 | 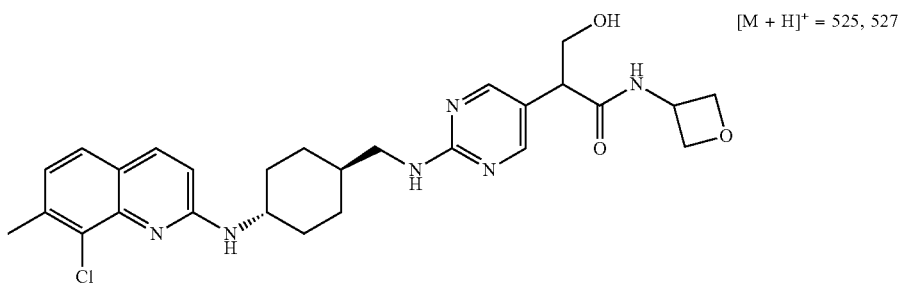 | [M + H]⁺ = 525, 527 |
| 7 | 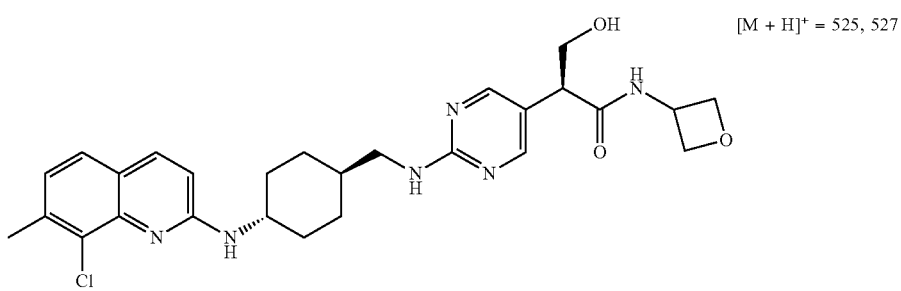 | [M + H]⁺ = 525, 527 |
or
| 8 | 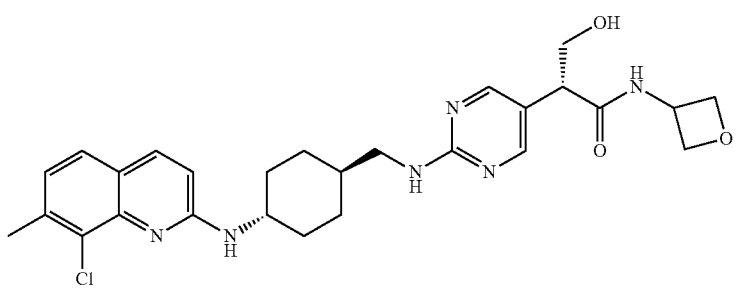 [SMILES: Cc1ccc2ccc(N[C@H]3CC[C@H](CNc4ncc([C@H](CO)C(=O)NC5COC5)cn4)CC3)nc2c1Cl] | |
| 9 | 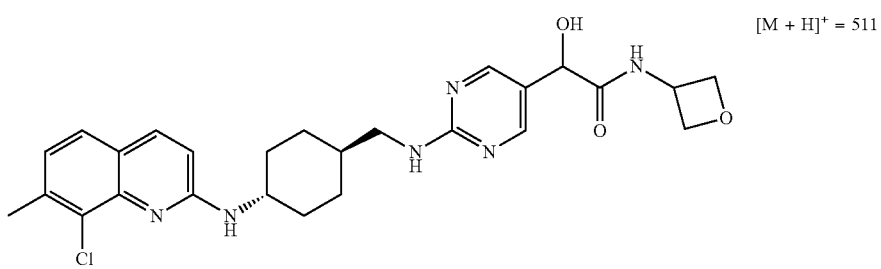 | [M + H]⁺ = 511 |
| 10 | 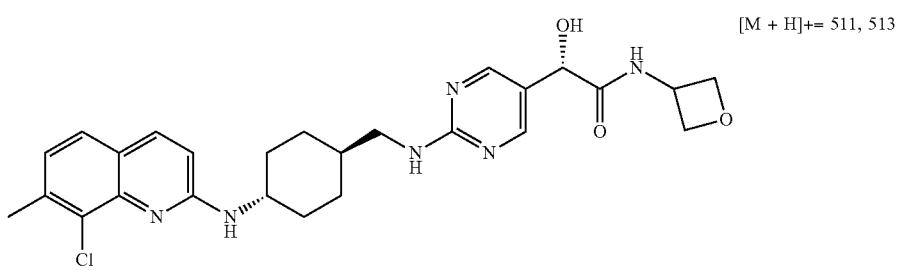 | [M + H]⁺ = 511, 513 |
or

| Example | | MS |
|---|---|---|
| 11 | 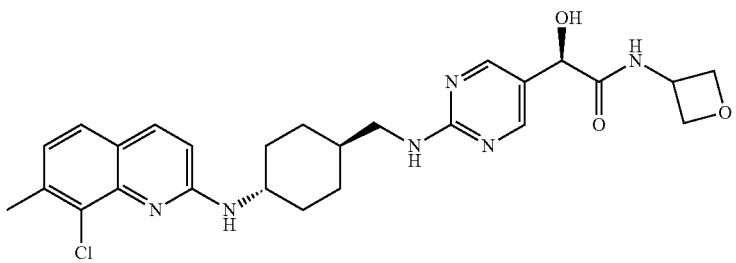 [SMILES: Cc1ccc2ccc(N[C@H]3CC[C@H](CNc4ncc([C@@H](O)C(=O)NC5COC5)cn4)CC3)nc2c1Cl] | |
| 12 | 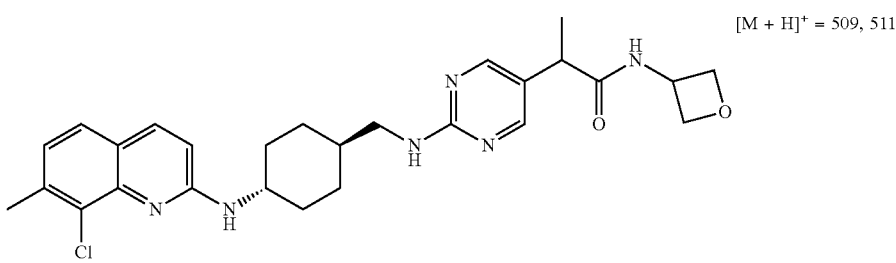 | [M + H]⁺ = 509, 511 |
| 13 | 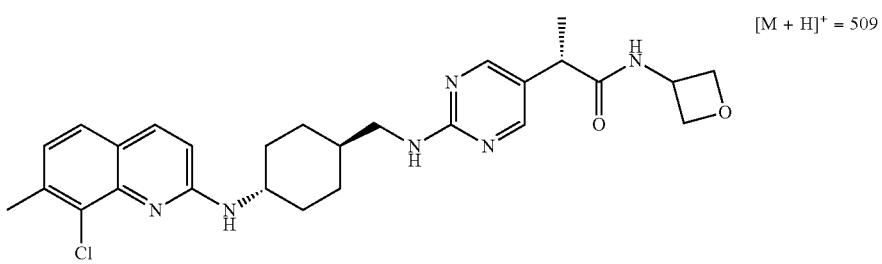 | [M + H]⁺ = 509 |
| | or | |
| 14 | 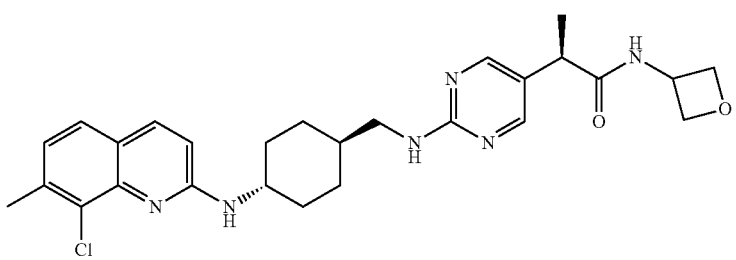 [SMILES: Cc1ccc2ccc(N[C@H]3CC[C@H](CNc4ncc([C@@H](C)C(=O)NC5COC5)cn4)CC3)nc2c1Cl] | |
| 15 | 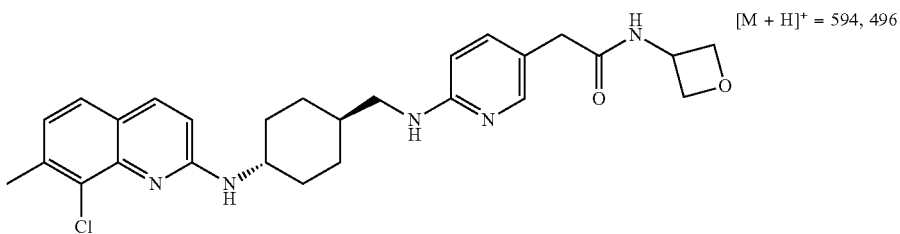 | [M + H]⁺ = 594, 496 |

Assays

The utility of the compounds of the invention may be demonstrated using any one of the following test procedures.

EZH2 LC-MS Assay

Representative compounds of the invention were serially and separately diluted 3-fold in DMSO to obtain twelve concentrations. Then the test compounds at each concentration (120 nL of each) were transferred by Mosquito into a 384-well Perkin Elmer ProxiPlate 384 plus plates. Solutions (6 μL) of 80 nM wild type PRC2 (wtPRC2) complex and 60 UM SAM in reaction buffer (20 mM Tris, pH 8.0, 0.1% BSA, 0.01% Triton, 0.5 mM DTT) were added to the wells that were then incubated with the test compound for 20 min. A 6 μL solution of 3 UM of the substrate peptide H3K27me1 (histone H3 [21-44]-K27me1-biotin) and 6 μM regulatory peptide H3K27me3 (histone H3 [21-44]-K27me3) in reaction buffer was added to initiate each reaction. The final components in the reaction solution include 40 nM wtPRC2 complex, 30 UM SAM, 1.5 UM H3K27me1 and 3 UM H3K27me3 peptides with varying concentration of the compounds. A positive control consisted of the enzyme at 40 nM, 30 μM SAM, 1.5 UM H3K27me1 and 3 UM H3K27me3 in the absence of the test compound, and a negative control consisted of 30 UM SAM, 1.5 UM H3K27me1 and 3 μM H3K27me3 only. Each reaction was incubated at room temperature for 120 min, then stopped by addition of 3 μL per of quench solution (2.5% TFA with 320 nM d4-SAH). The reaction mixture was centrifuged (Eppendorf centrifuge 5810, Rotor A-4-62) for 2 min at 2000 rpm and read on an API 4000 triple quadrupole mass spec with Turbulon Spray (Applied Biosystem) coupled with Prominence UFLC (Shimadzu). The levels of SAH production were normalized based on the values coming from the positive and negative controls to give percent enzyme activities. The data were fit to a dose response equation using the program Helios to get the IC56 values of the test compound.

ELISA (H3K27 methylation) assay

Representative compounds of the invention were serially and separately diluted 3-fold in DO to obtain a total of eight or twelve concentrations. Then the compounds were added to G401 cell cultured in 384-well plate at 1:500 dilution to obtain the highest concentration of 20 μM. The cells were further cultured for 48 h before ELISA procedure.

Histone extraction: Cells, in 384-well plate, were washed with PBS (10 x PBS buffer (80 g NaCl (Sigma, S3014), 2 g KCl (Sigma, 60128), 14.4 g $Na_2HPO_4$ (Sigma, S5136), 2.4 g $KH_2PO_4$ (Sigma, P9791) to 1 L water, pH to 7.4) and lysed with the addition of lysis buffer (0.4N HCl; 45 μl per well). The plate was gently agitated at 4° C. for 30 min. The cell lysate was neutralized with neutralization buffer (0.5 M sodium phosphate dibasic, pH 12.5. 1 mM DTT; 36 UL per well). The plate was agitated to ensure the lysates were well mixed prior to the ELISA protocol.

ELISA protocol: Cell lysates were transferred to the wells of a 384-well plate and the final volume was adjusted to 50 μL per well with PBS. The plate was sealed, centrifuged at 2,000 rpm for 2 min and incubated at 4° C. for about 16 h. The plate was washed with TBST buffer (1 x TBS (10x TBS: 24.2 g Tris (Sigma, T6066), 80 g NaCl (Sigma, S3014) to 1 L of water and adjust pH to 7.6 with HCl) with 0.1% Tween-20). Blocking buffer (TBST, 5% BSA; 50 UL per well) was added and the plate was incubated for 1 h at rt. The blocking buffer was removed and primary antibody was added (30 μL per well). The following dilutions were performed with blocking buffer: for anti-H3K27me3 antibody (Cell Signaling Technology, #9733), dilution was 1:1000; for anti-H3K27me2 antibody (Cell Signaling Technology, #9288), dilution was 1:100; for anti-H3 antibody (Abcam, Cat #24834), dilution was 1:1000. The primary antibody was incubated in the plate at rt for 1 h. The wells were washed with TBST and incubated with secondary antibody for 1 h at rt. For secondary antibodies, the following dilutions were carried out with blocking buffer: anti-rabbit antibody (Jackson ImmunoResearch, #111-035-003), dilution was 1:2000; and anti-mouse antibody (Cell signaling technology, #7076), dilution was 1:1000.

After 1 h of incubation at rt, the wells were washed with TBST. ECL substrate (Pierce, #34080) was added at 30 μL per well and the plates were centrifuged at 2,000 rpm for 2 min. The signal was read using a PerkinElmer Envision Reader. The H3K27 methylation readouts were normalized using H3 signal and then percentage inhibition was calculated against the samples treated with DO. The data were fit to a dose response curve using the program Helios to get the $IC_{50}$ values of the test compound.

Analysis of Cell Proliferation

B cell lymphoma cell KARPAS422 was cultured using standard cell culture conditions in RPMI-1640 (Invitrogen, cat #11875) supplemented with 15% FBS (Invitrogen, cat #10099-141) in humidified incubator at 37° C., 5% $CO_2$. To assess the effect of PRC2 inhibition on cell proliferation, exponentially growing cells were seeded at a density of $1 \times 10^5$ cells/mL in 12-well plate (Corning, cat #CLS3513). After cell seeding, a compound of the invention was added to the cell media (in concentrations ranging from 0 to 100 UM, 3x dilution series). Viable cell numbers were determined every 3-4 days for up to 14 days using Vi-CELL (Beckman Coulter). On days of cell counting, fresh growth media and compound were replenished and cells split back to a density of $1 \times 10^5$ cells/mL. Total cell number is expressed as split-adjusted viable cells per mL. The dose response curves and $IC_{50}$ values were generated using Prism. The exemplified Examples disclosed below were tested in the EZH2 LC- and/or EZH2 ELISA assays described above and found having EZH2 inhibitory activity.

Table 3 below lists IC, values in the EZH2 (a) LC-Qualified and/or (b) ELISA Qualified assays measured for the following examples.

TABLE 3

| Example | | EZH2 LC-MS (μM) | ELISA H3K27 Methylation (μM) |
|---|---|---|---|
| 1 | 2-(2-((((1R,4R)-4-((8-chloro-7-methylquinolin-2-yl)amino)cyclohexyl)methyl)amino)pyrimidin-5-yl)-N-(oxetan-3-yl)acetamide | +++ | +++ |
| 2 | 2-(2-((((1r,4r)-4-((8-chloro-7-methylquinolin-2-yl)amino)cyclohexyl)methyl)amino)pyrimidin-5-yl)-N-methyl-N-(oxetan-3-yl)acetamide | +++ | +++ |
| 3 | 2-(2-((((1r,4r)-4-((8-chloro-7-methylquinolin-2-yl)amino)cyclohexyl)methyl)amino)pyrimidin-5-yl)-2,2-difluoro-N-(oxetan-3-yl)acetamide | +++ | +++ |
| 4 | 2-(2-((((1r,4r)-4-((8-chloro-7-methylquinolin-2-yl)amino)cyclohexyl)methyl)amino)pyrimidin-5-yl)-2-hydroxy-N-(oxetan-3-yl)propanamide | +++ | + |
| 5 | 2-(2-((((1r,4r)-4-((8-chloro-7-methylquinolin-2-yl)amino)cyclohexyl)methyl)amino)pyrimidin-5-yl)-2-cyano-N-(oxetan-3-yl)acetamide | +++ | +++ |
| 6 | 2-(2-((((1r,4r)-4-((8-chloro-7-methylquinolin-2-yl)amino)cyclohexyl)methyl)amino)pyrimidin-5-yl)-3-hydroxy-N-(oxetan-3-yl)propanamide | +++ | +++ |

TABLE 3-continued

| Example | | EZH2 LC-MS (μM) | ELISA H3K27 Methylation (μM) |
|---|---|---|---|
| 7 | (S)-2-(2-(((((1r,4S)-4-((8-chloro-7-methylquinolin-2-yl)amino)cyclohexyl)methyl)amino)pyrimidin-5-yl)-3-hydroxy-N-(oxetan-3-yl)propanamide; or (R)-2-(2-(((((1r,4R)-4-((8-chloro-7-methylquinolin-2-yl)amino)cyclohexyl)methyl)amino)pyrimidin-5-yl)-3-hydroxy-N-(oxetan-3-yl)propanamide | ++ | ++ |
| 8 | (S)-2-(2-(((((1r,4S)-4-((8-chloro-7-methylquinolin-2-yl)amino)cyclohexyl)methyl)amino)pyrimidin-5-yl)-3-hydroxy-N-(oxetan-3-yl)propanamide; or (R)-2-(2-(((((1r,4R)-4-((8-chloro-7-methylquinolin-2-yl)amino)cyclohexyl)methyl)amino)pyrimidin-5-yl)-3-hydroxy-N-(oxetan-3-yl)propanamide | +++ | +++ |
| 9 | 2-(2-(((((1r,4r)-4-((8-chloro-7-methylquinolin-2-yl)amino)cyclohexyl)methyl)amino)pyrimidin-5-yl)-2-hydroxy-N-(oxetan-3-yl)acetamide | +++ | +++ |
| 10 | (S)-2-(2-(((((1r,4S)-4-((8-chloro-7-methylquinolin-2-yl)amino)cyclohexyl)methyl)amino)pyrimidin-5-yl)-2-hydroxy-N-(oxetan-3-yl)acetamide; or (R)-2-(2-(((((1r,4R)-4-((8-chloro-7-methylquinolin-2-yl)amino)cyclohexyl)methyl)amino)pyrimidin-5-yl)-2-hydroxy-N-(oxetan-3-yl)acetamide | ++ | ++ |
| 11 | (S)-2-(2-(((((1r,4S)-4-((8-chloro-7-methylquinolin-2-yl)amino)cyclohexyl)methyl)amino)pyrimidin-5-yl)-2-hydroxy-N-(oxetan-3-yl)acetamide; or (R)-2-(2-(((((1r,4R)-4-((8-chloro-7-methylquinolin-2-yl)amino)cyclohexyl)methyl)amino)pyrimidin-5-yl)-2-hydroxy-N-(oxetan-3-yl)acetamide | +++ | +++ |
| 12 | 2-(2-(((((1r,4r)-4-((8-chloro-7-methylquinolin-2-yl)amino)cyclohexyl)methyl)amino)pyrimidin-5-yl)-N-(oxetan-3-yl)propanamide | +++ | +++ |
| 13 | (S)-2-(2-(((((1r,4S)-4-((8-chloro-7-methylquinolin-2-yl)amino)cyclohexyl)methyl)amino)pyrimidin-5-yl)-N-(oxetan-3-yl)propanamide; or (R)-2-(2-(((((1r,4R)-4-((8-chloro-7-methylquinolin-2-yl)amino)cyclohexyl)methyl)amino)pyrimidin-5-yl)-N-(oxetan-3-yl)propanamide | +++ | n.d. |
| 14 | (S)-2-(2-(((((1r,4S)-4-((8-chloro-7-methylquinolin-2-yl)amino)cyclohexyl)methyl)amino)pyrimidin-5-yl)-N-(oxetan-3-yl)propanamide; or (R)-2-(2-(((((1r,4R)-4-((8-chloro-7-methylquinolin-2-yl)amino)cyclohexyl)methyl)amino)pyrimidin-5-yl)-N-(oxetan-3-yl)propanamide | +++ | n.d. |
| 15 | 2-(6-(((((1r,4r)-4-((8-chloro-7-methylquinolin-2-yl)amino)cyclohexyl)methyl)amino)pyridin-3-yl)-N-(oxetan-3-yl)acetamide | +++ | +++ | n.d. = not determined

| Legend: | "+++" | "++" | "+" |
| --- | --- | --- | --- |
| LCMS | <0.05 μM | 0.05-0.10 μM | >0.10 μM |
| ELISA H3K27 | <0.01 μM | 0.01-0.1 μM | >0.1 μM |

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes.

The invention claimed is:

1. A compound having the structure of Formula (I):

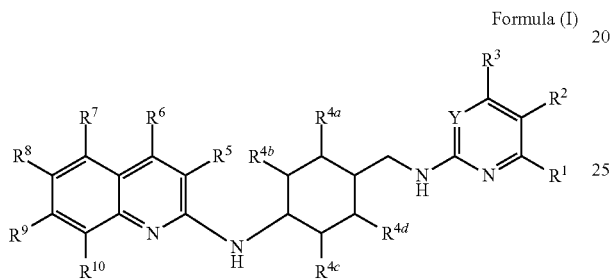

Formula (I)

or a stereoisomer, enantiomer, enantiomeric mixture or pharmaceutically acceptable salt thereof; wherein:

Y is N or $CR^a$;

$R^a$, $R^1$, $R^3$, $R^5$, $R^6$, $R^7$, $R^8$ and $R^9$ are independently is H, halogen or —$C_1$-$C_4$ alkyl;

$R^2$ is —CN, —$C_1$-$C_6$ alkyl, -hydroxy$C_1$-$C_4$ alkylene, —$C_1$-$C_4$ alkoxy, —$C_2$-$C_4$ alkoxy substituted with 1-2 hydroxyl;

—$(CR^{13}R^{14})_nC(=O)$ $NR^{11}R^{12}$, —$(CR^{13}R^{14})_nC(=O)$ $NR^{11}R^{15}$;

—$(CR^{13}R^{14})_nC(=O)$ $R^{15}$;

—$(CR^2)$ $NR^{11}C(=O)$ $R^{15}$, —$(CR^2)_nNR^{11}(CR^2)_2C(=O)$ $R^{15}$;

—$(CR^2)_nNR$—$C(=O)OR^{11}$, —$(CR^2)_nNR$—$C(=O)O$—$(CR^2)$—$R^{15}$;

—NR—$C(=O)(CR^2)_2C(=O)R^{15}$, —NR—$C(=O)$ $R^{11}$;

—$(CR^2)_nNR^{11}R^{12}$, —$(CR^2)_nNR^{11}$ $(CR^2)_nR^{15}$;

—$(CR^2)_nOR^{15}$, —$(CR^2)_nR^{15}$;

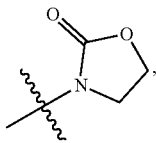 [SMILES: *N1CCOC1=O]

or a 5- to 6-membered heteroaryl having 1 to 4 heteroatoms independently selected from O, S and N;

$R^{4a}$, $R^{4b}$, $R^{4c}$ and $R^{4d}$ are independently H or —$C_1$-$C_4$ alkyl;

$R^{10}$ is H, halogen, —$C_1$-$C_4$ alkyl, —$C_1$-$C_4$ alkoxy, —$C_1$-$C_4$ haloalkoxy or —NH($C_1$-$C_4$ alkyl);

$R^{11}$ is H, —$C_1$-$C_4$ alkyl, -hydroxy$C_1$-$C_4$ alkylene, -cyano$C_1$-$C_4$ alkylene or —$C_1$-$C_4$ alkyl substituted with —$C_1$-$C_4$ alkoxy;

$R^{12}$ is H or —$C_1$-$C_4$ alkyl;

$R^{13}$ is H, halogen, —CN, —OH, —$C_1$-$C_4$ alkyl or -hydroxy$C_1$-$C_4$ alkylene;

$R^{14}$ is H, halogen or —$C_1$-$C_4$ alkyl;

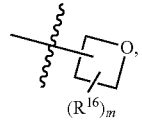

$R^{15}$ is —$C_3$-$C_6$cycloalkyl, or a 4- to 6-membered heterocycoalkyl having 1-2 heteroatoms independently selected from O, S, S(=O)$_2$, and N; wherein said —$C_3$-$C_6$cycloalkyl or 4- to 6-membered heterocycloalkyl of $R^{15}$ is unsubstituted or substituted with 1-2 substituents selected from —OH, —$C_1$-$C_4$ alkyl, -hydroxy$C_1$-$C_4$ alkylene, —$C_1$-$C_4$ alkoxy, —SO$_2$ ($C_1$-$C_4$ alkyl) and —N($C_1$-$C_4$ alkyl)$_2$;

$R^{16}$, if present, is a substituent selected from halogen, —CN, —OH, —$C_1$-$C_4$ alkyl and -hydroxy$C_1$-$C_4$ alkylene;

each R is independently H or —$C_1$-$C_4$ alkyl;

m is 0, 1 or 2; and each n is independently selected from 0, 1 and 2.

2. The compound of claim 1, or a stereoisomer, enantiomer, enantiomeric mixture or pharmaceutically acceptable salt thereof; wherein $R^2$ is —$(CH_2)_{1-2}C(=O) NR^{11}R^{15}$ or —$(CR^{13}R^{14})$—$C(=O) NR^{11}R^{15}$.

3. The compound of claim 1, or a stereoisomer, enantiomer, enantiomeric mixture or pharmaceutically acceptable salt thereof; wherein $R^2$ is

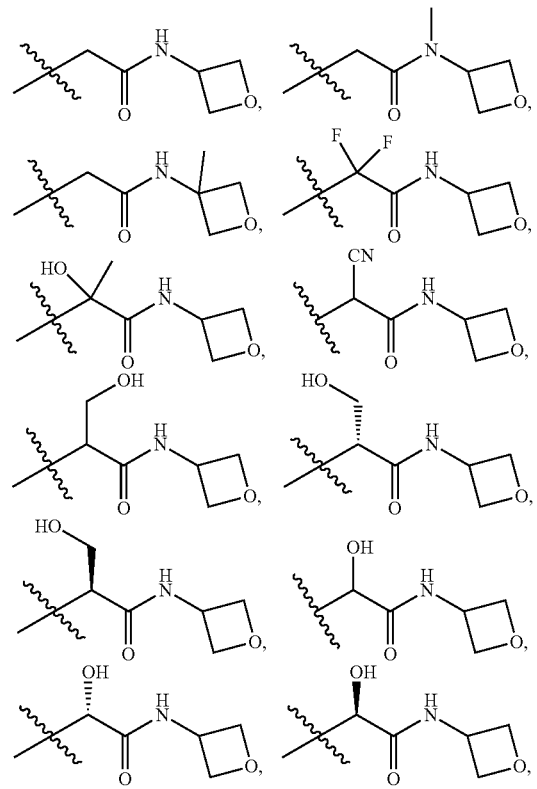

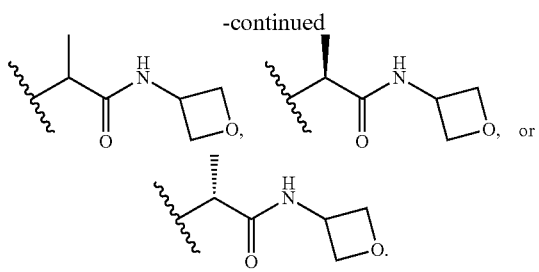

4. The compound of claim 1, wherein said compound is of Formula (II), or a stereoisomer, enantiomer, enantiomeric mixture or pharmaceutically acceptable salt thereof;

Formula (II)

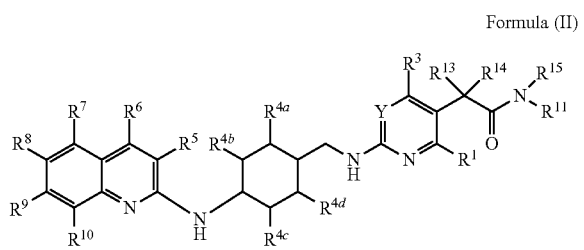

wherein:
Y is CH or N;
$R^1$, $R^3$, $R^{4a}$, $R^{4b}$, $R^{4c}$, $R^{4d}$ and $R^{11}$ are independently H or $C_1$-$C_4$ alkyl;
$R^5$, $R^6$, $R^7$, $R^8$, $R^9$ and $R^{10}$ are independently is H, halogen or $C_1$-$C_4$ alkyl;
$R^{13}$ is H, halogen, —CN, —OH, —$C_1$-$C_4$ alkyl or -hydroxy$C_1$-$C_4$ alkylene;
$R^{14}$ is H, halogen or —$C_1$-$C_4$ alkyl; and
$R^{15}$ is a 4- to 6-membered heterocycoalkyl having 1-2 heteroatoms independently selected from O, S and N; and wherein $R^{15}$ is unsubstituted or substituted with 1-2 substituents selected from —OH, —$C_1$-$C_4$ alkyl, -hydroxy$C_1$-$C_4$ alkylene, —$C_1$-$C_4$ alkoxy, —$SO_2$ ($C_1$-$C_4$ alkyl) and —$N(C_1$-$C_4$ alkyl$)_2$.

5. The compound of claim 4, or a stereoisomer, enantiomer, enantiomeric mixture or pharmaceutically acceptable salt thereof; wherein $R^{15}$ is

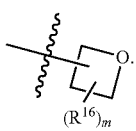

6. The compound of claim 5, or a stereoisomer, enantiomer, enantiomeric mixture or pharmaceutically acceptable salt thereof; wherein m is 1 and $R^{16}$ is —$C_1$-$C_4$ alkyl.

7. A compound selected from:
2-(2-(((4-((8-chloro-7-methylquinolin-2-yl)amino)cyclohexyl)methyl)amino)pyrimidin-5-yl)-N-methyl-N-(oxetan-3-yl)acetamide;
2-(2-(((4-((8-chloro-7-methylquinolin-2-yl)amino)cyclohexyl)methyl)amino)pyrimidin-5-yl)-2,2-difluoro-N-(oxetan-3-yl)acetamide;
2-(2-(((4-((8-chloro-7-methylquinolin-2-yl)amino)cyclohexyl)methyl)amino)pyrimidin-5-yl)-2-hydroxy-N-(oxetan-3-yl)propanamide;
2-(2-(((4-((8-chloro-7-methylquinolin-2-yl)amino)cyclohexyl)methyl)amino)pyrimidin-5-yl)-2-cyano-N-(oxetan-3-yl)acetamide;
2-(2-(((4-((8-chloro-7-methylquinolin-2-yl)amino)cyclohexyl)methyl)amino)pyrimidin-5-yl)-3-hydroxy-N-(oxetan-3-yl)propanamide;
2-(2-(((4-((8-chloro-7-methylquinolin-2-yl)amino)cyclohexyl)methyl)amino)pyrimidin-5-yl)-2-hydroxy-N-(oxetan-3-yl)acetamide;
2-(2-(((4-((8-chloro-7-methylquinolin-2-yl)amino)cyclohexyl)methyl)amino)pyrimidin-5-yl)-N-(oxetan-3-yl)propanamide; and
2-(6-(((4-((8-chloro-7-methylquinolin-2-yl)amino)cyclohexyl)methyl)amino)pyridin-3-yl)-N-(oxetan-3-yl)acetamide;
or a stereoisomer, enantiomer, enantiomeric mixture or pharmaceutically acceptable salt thereof.

8. A compound selected from:
2-(2-((((1r,4r)-4-((8-chloro-7-methylquinolin-2-yl)amino)cyclohexyl)methyl)amino)pyrimidin-5-yl)-N-methyl-N-(oxetan-3-yl)acetamide;
2-(2-((((1r,4r)-4-((8-chloro-7-methylquinolin-2-yl)amino)cyclohexyl)methyl)amino)pyrimidin-5-yl)-2,2-difluoro-N-(oxetan-3-yl)acetamide;
2-(2-((((1r,4r)-4-((8-chloro-7-methylquinolin-2-yl)amino)cyclohexyl)methyl)amino)pyrimidin-5-yl)-2-hydroxy-N-(oxetan-3-yl)propanamide;
2-(2-((((1r,4r)-4-((8-chloro-7-methylquinolin-2-yl)amino)cyclohexyl)methyl)amino)pyrimidin-5-yl)-2-cyano-N-(oxetan-3-yl)acetamide;
2-(2-((((1r,4r)-4-((8-chloro-7-methylquinolin-2-yl)amino)cyclohexyl)methyl)amino)pyrimidin-5-yl)-3-hydroxy-N-(oxetan-3-yl)propanamide;
(S)-2-(2-((((1r,4S)-4-((8-chloro-7-methylquinolin-2-yl)amino)cyclohexyl)methyl)amino)pyrimidin-5-yl)-3-hydroxy-N-(oxetan-3-yl)propanamide;
(R)-2-(2-((((1r,4R)-4-((8-chloro-7-methylquinolin-2-yl)amino)cyclohexyl)methyl)amino)pyrimidin-5-yl)-3-hydroxy-N-(oxetan-3-yl)propanamide;
2-(2-((((1r,4r)-4-((8-chloro-7-methylquinolin-2-yl)amino)cyclohexyl)methyl)amino)pyrimidin-5-yl)-2-hydroxy-N-(oxetan-3-yl)acetamide;
(S)-2-(2-((((1r,4S)-4-((8-chloro-7-methylquinolin-2-yl)amino)cyclohexyl)methyl)amino)pyrimidin-5-yl)-2-hydroxy-N-(oxetan-3-yl)acetamide;
(R)-2-(2-((((1r,4R)-4-((8-chloro-7-methylquinolin-2-yl)amino)cyclohexyl)methyl)amino)pyrimidin-5-yl)-2-hydroxy-N-(oxetan-3-yl)acetamide;
2-(2-((((1r,4r)-4-((8-chloro-7-methylquinolin-2-yl)amino)cyclohexyl)methyl)amino)pyrimidin-5-yl)-N-(oxetan-3-yl)propanamide;
(S)-2-(2-((((1r,4S)-4-((8-chloro-7-methylquinolin-2-yl)amino)cyclohexyl)methyl)amino)pyrimidin-5-yl)-N-(oxetan-3-yl)propanamide;
(R)-2-(2-((((1r,4R)-4-((8-chloro-7-methylquinolin-2-yl)amino)cyclohexyl)methyl)amino)pyrimidin-5-yl)-N-(oxetan-3-yl)propanamide; and
2-(6-((((1r,4r)-4-((8-chloro-7-methylquinolin-2-yl)amino)cyclohexyl)methyl)amino)pyridin-3-yl)-N-(oxetan-3-yl)acetamide;
or a stereoisomer, enantiomer, enantiomeric mixture or pharmaceutically acceptable salt thereof.

9. The compound of claim 1, wherein said compound is 2-(2-(((4-((8-chloro-7-methylquinolin-2-yl)amino)cyclohexyl)methyl)amino)pyrimidin-5-yl)-N-(oxetan-3-yl)acetamide; or a stereoisomer, enantiomer, enantiomeric mixture or pharmaceutically acceptable salt thereof.

10. The compound of claim 1, wherein said compound is 2-(2-((((1R,4R)-4-((8-chloro-7-methylquinolin-2-yl)amino)cyclohexyl)methyl)amino)pyrimidin-5-yl)-N-(oxetan-3-yl) acetamide; or an enantiomeric mixture or a pharmaceutically acceptable salt thereof.

11. The compound of claim 1, wherein said compound is 2-(2-(((4-((8-chloro-7-methylquinolin-2-yl)amino)cyclohexyl)methyl)amino)pyrimidin-5-yl)-N-(oxetan-3-yl)propanamide; or a stereoisomer, enantiomer, enantiomeric mixture or pharmaceutically acceptable salt thereof.

12. The compound of claim 1, wherein said compound is(S)-2-(2-((((1r,4S)-4-((8-chloro-7-methylquinolin-2-yl)amino)cyclohexyl)methyl)amino)pyrimidin-5-yl)-N-(oxetan-3-yl)propanamide or (R)-2-(2-((((1r,4R)-4-((8-chloro-7-methylquinolin-2-yl)amino)cyclohexyl)methyl)amino)pyrimidin-5-yl)-N-(oxetan-3-yl)propanamide; or an enantiomeric mixture or a pharmaceutically acceptable salt thereof.

13. The compound of claim 1, wherein said compound is 2-(6-(((4-((8-chloro-7-methylquinolin-2-yl)amino)cyclohexyl)methyl)amino)pyridin-3-yl)-N-(oxetan-3-yl)acetamide; or a stereoisomer, enantiomer, enantiomeric mixture or pharmaceutically acceptable salt thereof.

14. The compound of claim 1, wherein said compound is 2-(6-((((1r,4r)-4-((8-chloro-7-methylquinolin-2-yl)amino)cyclohexyl)methyl)amino)pyridin-3-yl)-N-(oxetan-3-yl)acetamide; or an enantiomeric mixture or a pharmaceutically acceptable salt thereof.

15. A pharmaceutical composition comprising a compound of claim 1 and a pharmaceutically acceptable carrier.

16. A combination comprising a compound of claim 1, and one or more therapeutically active agent.

17. The combination of claim 16, wherein said one or more therapeutically active agent is selected from an anti-cancer agent, immunomodulator, anti-allergic agent, anti-nausea agent, pain reliever, and a cytoprotective agent.

18. A method for treating a disease or condition mediated by Enhancer of Zeste Homolog 2 (EZH2), Polycomb Repressive Complex 2 (PRC2), or a combination of Enhancer of Zeste Homolog 2 (EZH2) and Polycomb Repressive Complex 2 (PRC2), comprising administering to a subject in need of such treatment a therapeutically effective amount of a compound of claim 1.

19. The method of claim 18, wherein said disease or condition is diffuse large B cell lymphoma (DLBCL), follicular lymphoma, leukemia, multiple myeloma, gastric cancer, malignant rhabdoid tumor, hepatocellular carcinoma, prostate cancer, breast carcinoma, bile duct and gallbladder cancers, bladder carcinoma, neuroblastoma, schwannoma, glioma, glioblastoma and astrocytoma, cervical cancer, colon cancer, melanoma, endometrial cancer, esophageal cancer, head and neck cancer, lung cancer, nasopharyngeal carcinoma, ovarian cancer, pancreatic cancer, renal cell carcinoma, rectal cancer, thyroid cancers, parathyroid tumors, uterine tumors, rhabdomyosarcoma, Kaposi sarcoma, synovial sarcoma, osteosarcoma, or Ewing's sarcoma.

\* \* \* \* \*